United States Patent
Hirotani

(10) Patent No.: US 10,348,933 B2
(45) Date of Patent: Jul. 9, 2019

(54) IMAGE PROCESSING APPARATUS, IMAGE PROCESSING METHOD, AND NON-TRANSITORY RECORDING MEDIUM

(71) Applicant: Takuya Hirotani, Kanagawa (JP)

(72) Inventor: Takuya Hirotani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 66 days.

(21) Appl. No.: 15/812,121

(22) Filed: Nov. 14, 2017

(65) Prior Publication Data
US 2018/0139358 A1   May 17, 2018

(30) Foreign Application Priority Data

Nov. 15, 2016 (JP) ................... 2016-222641
Aug. 7, 2017 (JP) ................... 2017-152688

(51) Int. Cl.
*H04N 1/60* (2006.01)

(52) U.S. Cl.
CPC ......... *H04N 1/6019* (2013.01); *H04N 1/6008* (2013.01); *H04N 2201/0094* (2013.01)

(58) Field of Classification Search
CPC ............... H04N 1/6019; H04N 1/6008; H04N 2201/0094
See application file for complete search history.

(56) References Cited

U.S. PATENT DOCUMENTS

2017/0168759 A1   6/2017   Hirotani et al.

FOREIGN PATENT DOCUMENTS

| JP | 2010-162802 | 7/2010 |
| JP | 2016-009992 | 1/2016 |
| JP | 2017-021654 | 1/2017 |

*Primary Examiner* — Christopher Wait
(74) *Attorney, Agent, or Firm* — Duft & Bornsen, PC

(57) ABSTRACT

An image processing apparatus includes an indexing determiner, an index processor, a line combiner, a drawing processor, and an image forming device. The indexing determiner determines whether color information of pixels forming a line in printing target data are expressible by index colors. The color information is expressed by RGB. The index processor generates an index color image that includes pixels obtained by expressing, using the index colors, the color information of the pixels determined to be expressible by the index colors. The line combiner combines pixels of which the color information is expressed in a same aspect in a plurality of lines to generate an RGB image region and an index color image region. The drawing processor performs a drawing process on each of the RGB image region and the index color image region to generate drawing information. The image forming device processes the drawing information.

15 Claims, 26 Drawing Sheets

| 0 | 0 | 1 | 2 | 3 |
| 0 | 1 | 2 | 3 | 2 |
| 1 | 2 | 3 | 2 | 1 |
| 2 | 3 | 2 | 1 | 0 |
| 3 | 2 | 1 | 0 | 0 |

LINE 1: BLACK TEXT
LINE 2: IMAGE
LINE 3: RED TEXT
LINE 4: BLACK TEXT AND IMAGE
LINE 5: IMAGE AND BLACK TEXT
LINE 6: BLACK TEXT, IMAGE, AND BLACK TEXT
LINE 7: BLACK TEXT, IMAGE, BLACK TEXT, IMAGE, AND BLACK TEXT
LINE 8: IMAGE, BLACK TEXT, IMAGE, AND BLACK TEXT
LINE 9: RED TEXT AND BLACK TEXT

| LINE | INDEX TABLE | RGB IMAGE | LEADING END OF RGB IMAGE | REAR END OF RGB IMAGE |
|---|---|---|---|---|
| LINE1 | WHITE AND BLACK | ABSENT | – | – |
| LINE2 | – | PRESENT | 1 | 25 |
| LINE3 | WHITE AND RED | ABSENT | – | – |
| LINE4 | WHITE AND BLACK | PRESENT | 20 | 24 |
| LINE5 | WHITE AND BLACK | PRESENT | 4 | 9 |
| LINE6 | WHITE AND BLACK | PRESENT | 12 | 17 |
| LINE7 | WHITE AND BLACK | PRESENT | 5 | 20 |
| LINE8 | WHITE AND BLACK | PRESENT | 3 | 20 |
| LINE9 | WHITE AND BLACK | PRESENT | 3 | 5 |

FIG. 17

| PIXEL | INDEX TABLE | INDEX IMAGE | RGB IMAGE | LEADING END OF RGB IMAGE | REAR END OF RGB IMAGE |
|---|---|---|---|---|---|
| ① | No R G B / 0 0xFF 0xFF 0xFF / 1 - - - | 0 | ABSENT | - | - |
| ② | No R G B / 0 0xFF 0xFF 0xFF / 1 0x00 0x00 0x00 | 01 | ABSENT | - | - |
| ③ | No R G B / 0 0xFF 0xFF 0xFF / 1 0x00 0x00 0x00 | 010 | ABSENT | - | - |
| ④ | No R G B / 0 0xFF 0xFF 0xFF / 1 0x00 0x00 0x00 | 0101 | ABSENT | - | - |
| ⑤ | No R G B / 0 0xFF 0xFF 0xFF / 1 0x00 0x00 0x00 | 01010 | ABSENT | - | - |
| ⑥ | No R G B / 0 0xFF 0xFF 0xFF / 1 0x00 0x00 0x00 | 010100 | PRESENT | 6 | 6 |
| ⑦ | No R G B / 0 0xFF 0xFF 0xFF / 1 0x00 0x00 0x00 | 0101000 | PRESENT | 6 | 7 |
| ⑧ | No R G B / 0 0xFF 0xFF 0xFF / 1 0x00 0x00 0x00 | 01010000 | PRESENT | 6 | 8 |
| ⑨ | No R G B / 0 0xFF 0xFF 0xFF / 1 0x00 0x00 0x00 | 010100000 | PRESENT | 6 | 8 |

| LINE | INDEX TABLE | PRESENCE OR ABSENCE OF RGB IMAGE | NUMBER OF PIXEL AT LEADING END OF RGB IMAGE | NUMBER OF PIXEL AT REAR END OF RGB IMAGE |
|---|---|---|---|---|
| LINE N-1 | ABSENT | PRESENT | 20 | 24 |
| LINE N | ABSENT | PRESENT | 19 | 23 |
| LINE N+1 | ABSENT | PRESENT | 18 | 22 |

FIG. 25

| LINE | PRESENCE OR ABSENCE OF CONTINUOUS RGB IMAGE DATA | NUMBER OF CONTINUOUS RGB IMAGE DATA | CONTINUOUS RGB IMAGE DATA 24a | | CONTINUOUS RGB IMAGE DATA 24b | |
|---|---|---|---|---|---|---|
| | | | LEADING END | REAR END | LEADING END | REAR END |
| LINE N-4 | PRESENT | 1 | 4 | 9 | | |
| LINE N-3 | PRESENT | 1 | 4 | 9 | | |
| LINE N-2 | PRESENT | 1 | 4 | 9 | | |
| LINE N-1 | PRESENT | 1 | 4 | 9 | | |
| LINE N | PRESENT | 2 | 4 | 9 | 19 | 24 |
| LINE N+1 | PRESENT | 2 | 4 | 9 | 19 | 24 |
| LINE N+2 | PRESENT | 1 | 19 | 24 | | |
| LINE N+3 | PRESENT | 1 | 19 | 24 | | |
| LINE N+4 | PRESENT | 1 | 19 | 24 | | |
| LINE N+5 | PRESENT | 1 | 19 | 24 | | |

| CONTINUOUS RGB IMAGE DATA | STARTING LINE | END LINE | START PIXEL POSITION | END PIXEL POSITION |
|---|---|---|---|---|
| CONTINUOUS RGB IMAGE DATA 24a | LINE N-4 | LINE N+1 | 4 | 9 |
| CONTINUOUS RGB IMAGE DATA 24b | LINE N | LINE N+5 | 19 | 24 |

IMAGE PROCESSING APPARATUS, IMAGE PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2016-222641, filed on Nov. 15, 2016, and Japanese Patent Application No. 2017-152688, filed on Aug. 7, 2017, in the Japan Patent Office, the entire disclosure of which is hereby incorporated by reference herein.

BACKGROUND

Technical Field

Aspects of the present disclosure relate to an image processing apparatus, an image processing method, and a non-transitory recording medium.

Related Art

In recent years, information has been digitized. Image processing apparatuses, such as a printer or a facsimile machine used to output digitized information and a scanner used to digitize a document, are indispensable. In general, the image processing apparatus is a multifunction peripheral that has, for example, an imaging function, an image formation function, and a communication function and can be used as a printer, a facsimile, a scanner, and a copier.

In the image processing apparatus, when a document file created by a word processing application, such as Word (registered trademark), is printed as print data, image processing is performed using a post description language (PDL). In general, a Word document file includes a plurality of objects, such as text, a vector image, and a raster image. Therefore, objects in the same page include a monochromatic object and a color object.

A technique has been proposed which converts each object into an index color in print data in which a monochromatic object and a color object are mixed on the same page to draw an image with high efficiency.

The index color is a form of expressing an image with a small number of colors with reference to a color look-up table for defining colors.

For example, a drawing process is performed for an image object with a small number of colors using the index colors to draw the image object with high efficiency.

SUMMARY

In an aspect of the present disclosure, there is provided an image processing apparatus that includes an indexing determiner, an index processor, a line combiner, a drawing processor, and an image forming device. The indexing determiner determines whether color information of pixels forming a line in printing target data are expressible by index colors. The color information is expressed by RGB. The index processor generates an index color image that includes pixels obtained by expressing, using the index colors, the color information of the pixels determined to be expressible by the index colors. The line combiner combines pixels of which the color information is expressed in a same aspect in a plurality of lines to generate an RGB image region that is a region of pixels of which the color information is expressed by the RGB and an index color image region that is a region of the index color image. The drawing processor performs a drawing process on each of the RGB image region and the index color image region to generate drawing information. The image forming device processes the drawing information.

In another aspect of the present disclosure, there is provided an image processing method that includes determining whether color information of pixels forming a line in printing target data are expressible by index colors, the color information being expressed by RGB; generating an index color image that includes pixels obtained by expressing, using the index colors, the color information of pixels determined to be expressible by the index colors; combining pixels of which the color information is expressed in a same aspect in a plurality of lines to generate an RGB image region that is a region of pixels of which the color information is expressed by the RGB and an index color image region that is a region of the index color image; and performing a drawing process on each of the RGB image region and the index color image region to generate drawing information to be processed by an image forming device.

In still another aspect of the present disclosure, there is provided a non-transitory recording medium storing program code that, when executed by one or more processors, causes the processors to perform an image processing method. The method includes determining whether color information of pixels forming a line in printing target data are expressible by index colors, the color information being expressed by RGB; generating, using the index colors, an index color image that includes pixels obtained by expressing the color information of pixels determined to be expressible by the index colors; combining pixels of which the color information is expressed in a same aspect in a plurality of lines to generate an RGB image region that is a region of pixels of which the color information is expressed by the RGB and an index color image region that is a region of the index color image; and performing a drawing process on each of the RGB image region and the index color image region to generate drawing information to be processed by an image forming device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 17 is a diagram illustrating an update aspect of the RGB position information in the first embodiment of the present disclosure;

FIG. 25 is a diagram illustrating the RGB position information of each line in printing target data in the second embodiment of the present disclosure;

Figure 1:
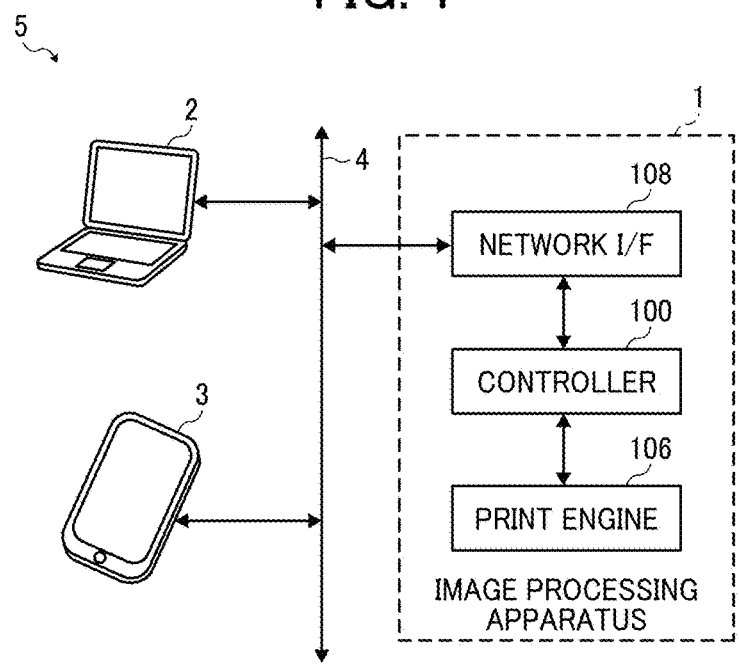
FIG. 1 is a diagram illustrating the operation form of an image processing system according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

Hereinafter, an embodiment of the present disclosure will be described with reference to the drawings. In this embodiment, an example of an image processing system that prints print data received from an information processing terminal, such as a personal computer (PC) or a tablet PC connected to a network, will be described.

FIG. 1 is a diagram illustrating an operation form of an image processing system 5 according to this embodiment. As illustrated in FIG. 1, the image processing system 5 according to this embodiment includes an image processing apparatus 1, a PC 2, and a tablet terminal 3 which are connected to each other through a network 4.

The image processing apparatus 1 is, for example, an electrophotographic or inkjet printer that forms and outputs an image, without using a printing plate, and includes a controller 100, a network I/F 108, and a print engine 106. The controller 100 is a control unit that directs the print engine 106 to print out an image. The print engine 106 functions as an image forming device. In addition, the controller 100 generates raster data which is image data referred to by the print engine 106 to print out an image. The raster data is drawing information in which data to be printed is drawn.

The PC 2 and the tablet terminal 3 are client terminals that are operated by the user of the image processing system 5 and transmit the data to be printed to the image processing apparatus 1 through the network 4 such that the image processing apparatus 1 can print out the data. The PC 2 or the tablet terminal 3 displays a graphical user interface (GUI) for instructing the image processing apparatus 1 to print out an image in response to an operation of the user. For example, the user inputs data or sets printing conditions through the GUI of the PC 2 or the tablet terminal 3.

Figure 2:
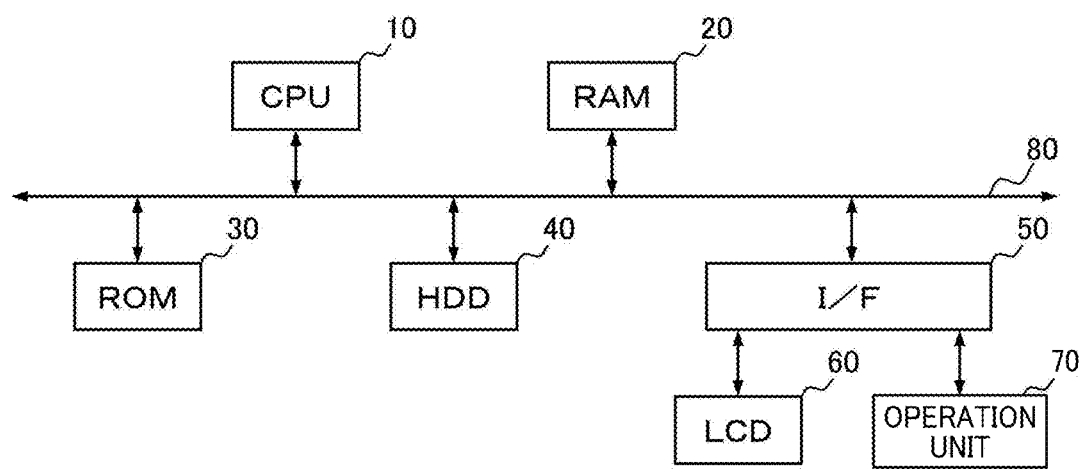
FIG. 2 is a block diagram illustrating the hardware configuration of an information processing apparatus according to the first embodiment of the present disclosure.

Next, the hardware configuration of an information processing apparatus, such as the image processing apparatus 1, the PC 2, or the tablet terminal 3 according to this embodiment, will be described with reference to FIG. 2. As illustrated in FIG. 2, the information processing apparatus according to this embodiment has the same configuration as a general server or a general PC. That is, the image processing apparatus 1, the PC 2, and the tablet terminal 3 according to this embodiment are information processing apparatuses having the same configuration and have the following hardware configurations.

That is, the information processing apparatus includes a central processing unit (CPU) 10, a random access memory (RAM) 20, a read only memory (ROM) 30, a hard disk drive (HDD) 40, and an I/F 50 which are connected to each other through a bus 80. In addition, a liquid crystal display (LCD) 60 and an operation unit 70 are connected to the I/F 50.

The CPU 10 is a processor and controls the overall operation of the information processing apparatus. The RAM 20 is a volatile storage medium which information can be read from or can be written to at a high speed and is used as a work area when the CPU 10 processes information. The ROM 30 is a non-volatile read only storage medium and stores a program such as firmware. The HDD 40 is a non-volatile storage medium which information can be read from or can be written to and stores, for example, an operating system (OS), various control programs, and application programs.

The I/F 50 connects the bus 80 and various hardware components or the network 4 and controls the connection. The LCD 60 is a visual user interface that is used by the user to check the state of the information processing apparatus. The operation unit 70 is a user interface such as a keyboard or a mouse used by the user to input information to the information processing apparatus.

In the hardware configuration, the CPU 10 performs an operation according to steps of the program stored in the ROM 30 or steps of the program loaded from a storage medium, such as the HDD 40 or an optical disc, to the RAM 20 to form a software controller. The formed software controller and hardware are combined to form functional blocks for implementing the functions of, for example, the image processing apparatus 1, the PC 2, and the tablet terminal 3 according to this embodiment and to implement an image processing method and an image processing program.

Figure 3:
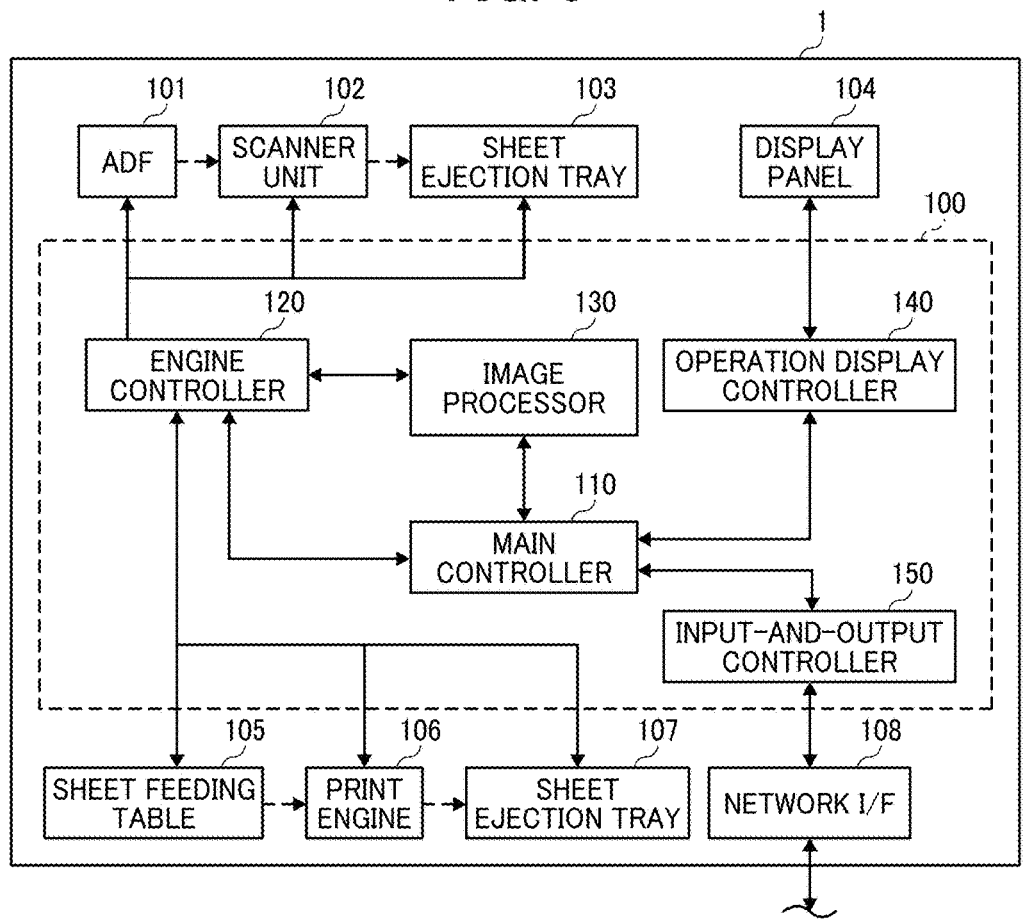
FIG. 3 is a block diagram illustrating the functional configuration of an image processing apparatus according to the first embodiment of the present disclosure.

Next, the functional configuration of the image processing apparatus 1 according to this embodiment will be described with reference to FIG. 3. As illustrated in FIG. 3, the image processing apparatus 1 according to this embodiment includes the controller 100, an auto document feeder (ADF) 101, a scanner unit 102, a sheet ejection tray 103, a display panel 104, a sheet feeding table 105, the print engine 106, a sheet ejection tray 107, and the network I/F 108.

The controller 100 includes a main controller 110, an engine controller 120, an image processor 130, an operation display controller 140, and an input-and-output controller 150. As illustrated in FIG. 3, the image processing apparatus 1 according to this embodiment is configured as a multi-function peripheral including the scanner unit 102 and the print engine 106. In FIG. 3, an electrical connection is represented by a solid arrow and the flow of a sheet is represented by a dashed arrow.

The display panel 104 is a display that visually displays the state of the image processing apparatus 1 and is also an input unit that is used as a touch panel by the user to directly operate the image processing apparatus 1 or to input information to the image processing apparatus 1. That is, the display panel 104 has a function of displaying an image for receiving an operation of the user. The display panel 104 is implemented by the LCD 60 and the operation unit 70 illustrated in FIG. 2. Therefore, the display panel 104 functions as an operation display.

The network I/F 108 is an interface for communication between the image processing apparatus 1 and other apparatuses through the network 4 and is, for example, Ethernet (registered trademark) or a universal serial bus (USB) interface. The network I/F 108 can perform communication using a TCP/IP protocol. When the image processing apparatus 1 functions as a facsimile, the network I/F 108 also functions as an interface for facsimile transmission. Therefore, the network I/F 108 is connected to a telephone line. The network I/F 108 is implemented by the I/F 50 illustrated in FIG. 2.

The controller 100 is implemented by a combination of software and hardware. Specifically, the program stored in the ROM 30 or a non-volatile memory and the HDD 40 or a non-volatile storage medium, such as an optical disc, is loaded to a volatile memory (hereinafter, referred to as a memory), such as the RAM 20, and the CPU 10 performs an operation according to the program to implement a software controller and hardware such as an integrated circuit. The controller 100 is implemented by the software controller and the hardware. The controller 100 functions as a controller that controls the overall operation of the image processing apparatus 1.

The main controller 110 has a function of controlling each component in the controller 100 and issues commands to each component of the controller 100. The engine controller 120 functions as a driver that controls or drives, for example, the print engine 106 or the scanner unit 102. The image processor 130 generates drawing information according to image information to be printed out, under the control of the main controller 110. The drawing information is raster data which is information for drawing an image to be formed by the print engine 106, which is an image forming device, during an image formation operation.

The image processor 130 processes imaging data input from the scanner unit 102 to generate image data. The image data is information that is stored as the result of a scanning operation in a storage region of the image processing apparatus 1 or is transmitted to another information processing terminal or another storage device through the network I/F 108.

The operation display controller 140 displays information on the display panel 104 or notifies the main controller 110 of information input through the display panel 104. The input-and-output controller 150 inputs information input through the network I/F 108 to the main controller 110. The main controller 110 controls the input-and-output controller 150 so as to access another apparatus connected to the network 4 through the network I/F 108.

When the image processing apparatus 1 operates as a printer, first, the input-and-output controller 150 receives a print job through the network I/F 108. The input-and-output controller 150 transmits the received print job to the main controller 110. When receiving the print job, the main controller 110 controls the image processor 130 such that the image processor 130 generates drawing information according to document information or image information included in the print job.

When the drawing information is generated by the image processor 130, the engine controller 120 controls the print engine 106 such that the print engine 106 forms an image on the sheet transported from the sheet feeding table 105 according to the generated drawing information. That is, the image processor 130, the engine controller 120, and the print engine 106 function as an image formation/output unit. For example, an inkjet image formation mechanism or an electrophotographic image formation mechanism can be used as a specific aspect of the print engine 106. The document on which the image has been formed by the print engine 106 is discharged to the sheet ejection tray 107.

When the image processing apparatus 1 operates as a scanner, the operation display controller 140 or the input-and-output controller 150 transmits a scanning execution signal to the main controller 110 in response to a scanning execution command that is input by the user through the display panel 104 or is input from another terminal through the network I/F 108. The main controller 110 controls the engine controller 120 according to the received scanning execution signal.

The engine controller 120 drives the ADF 101 to transport an imaging target document set on the ADF 101 to the scanner unit 102. In addition, the engine controller 120 drives the scanner unit 102 to capture an image of the document transported from the ADF 101. In a case in which no document is set on the ADF 101 and a document is directly set on the scanner unit 102, the scanner unit 102 captures an image of the set document under the control of the engine controller 120. That is, the scanner unit 102 operates as an imaging unit and the engine controller 120 functions as a reading controller.

In an imaging operation, an imaging element, such as a contact image sensor (CIS) or a charge-coupled device (CCD) in the scanner unit 102, optically scans a document and imaging information is generated according to optical information. The engine controller 120 transmits the imaging information generated by the scanner unit 102 to the image processor 130. The image processor 130 generates image information according to the imaging information received from the engine controller 120 under the control of the main controller 110.

The main controller 110 acquires the image information generated by the image processor 130 and stores the image information in a storage medium, such as the HDD 40, in the image processing apparatus 1. That is, the scanner unit 102, the engine controller 120, and the image processor 130 function as an image input unit in operative association with each other. The image information generated by the image processor 130 is stored in, for example, the HDD 40, without any change, or is transmitted to an external apparatus through the input-and-output controller 150 and the network I/F 108, in response to a command from the user.

When the image processing apparatus 1 operates as a copier, the image processor 130 generates drawing information according to the imaging information received from the scanner unit 102 by the engine controller 120 or the image information generated by the image processor 130. The engine controller 120 drives the print engine 106 according to the drawing information as in the operation of the printer. When the drawing information and the imaging information have the same format, the imaging information may be used as the drawing information without any change.

When generating the drawing information, the image processing apparatus 1 according to this embodiment performs a process for expressing color information with reference to a color look-up table for defining colors that are called index colors. Next, a method for expressing an image using the index color will be described with reference to the drawings.

Figure 4:
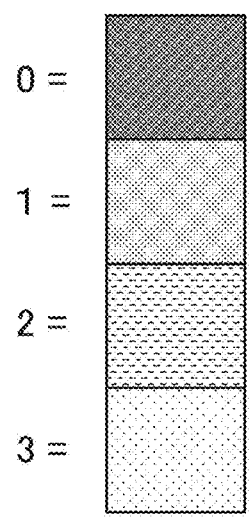
FIG. 4 is a diagram illustrating an index color table according to the first embodiment of the present disclosure.

FIG. 4 is a diagram illustrating an index color table according to this embodiment. As illustrated in FIG. 4, the index color table is a color look-up table in which all color patterns included in an image are stored. FIG. 4 illustrates, as an example of the index color table, an example of the structure of an index color table in which numbers 0 to 4 are allocated as index numbers to four color patterns.

Hereinafter, it is assumed that this embodiment is described using the four color patterns illustrated in FIG. 4. The types of color patterns included in the index color table are not limited to four colors. For example, individual index numbers may be allocated to the color patterns of which the number is greater than four and may be managed.

Figures 5, 6:
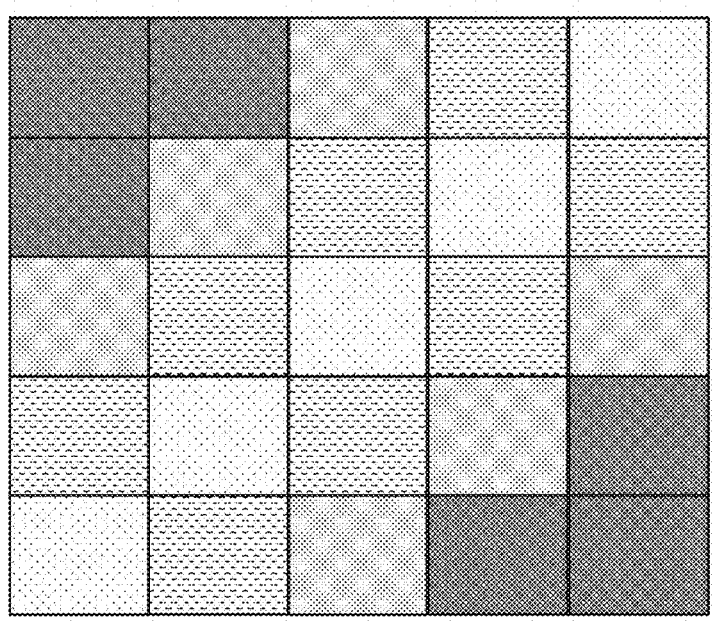
FIG. 5 is a diagram illustrating an index color image according to the first embodiment of the present disclosure.
FIG. 6 is a diagram illustrating an image to which the index color image according to the first embodiment of the present disclosure is applied.

FIG. 5 is a diagram illustrating an index color image according to this embodiment. As illustrated in FIG. 5, in the index color image, the color of each pixel is represented by the index number in the index color table. FIG. 5 illustrates the index color image formed by the colors included in the index color table illustrated in FIG. 4.

FIG. 6 illustrates an image obtained by applying the index color table illustrated in FIG. 4 to the index color image illustrated in FIG. 5. The image illustrated in FIGS. 4 to 6 is a 25-pixel image with a size of 5 pixels by 5 pixels. The number of colors forming the image is 4. Therefore, in the index color image illustrated in FIG. 5, when one pixel is represented by 2 bits (that is, 2 bits per pixel: 2 BPP), it is possible to express each pixel forming the image.

When the data size of the image illustrated in FIG. 6 is calculated on the basis of this configuration, the data size is "2 bits×25 pixels=50 bits=6.25 bytes". The index color image illustrated in FIG. 5 can be expressed by a data size of 6.25 bytes.

When the image illustrated in FIG. 6 is an RGB image expressed by 24-bit RGB data, the data size of the image illustrated in FIG. 6 is "24 bits×25 pixels=600 bits=75 bytes". That is, the data size of the RGB image is equal to or greater than ten times the data size of the index color image.

As such, the data size of the image using the index colors can be significantly less than the data size of the image without using the index colors. The use of the index colors makes it possible to convert data into CMYK data expressed by CMYK (cyan, magenta, yellow, and black) with high efficiency.

For example, it is assumed that the processing time required to convert a 1-pixel RGB image into CMYK data is 10 microseconds (μs). In this case, when the image illustrated in FIG. 6 is an RGB image, a process of converting each RGB pixel into each CMYK pixel is performed. Therefore, a processing time of "10 μs×25 pixels=250 μs" is required.

When the index colors are used, first, a process of converting the colors managed in the index color table into CMYK data is performed. Then, the index color table obtained by converting index image data into CMYK data is applied to the image illustrated in FIG. 6 to acquire CMYK data.

In this case, a process of converting RGB data into CMYK data is performed for the color patterns included in the index color table, that is, four color patterns. Therefore, the processing time is "10 μs×four colors=40 μs".

When the index colors are used, it is possible to reduce both the data size of an image and the image processing time. The application of this configuration makes it possible to reduce the data size of an image and to reduce the image processing time in image processing performed in a case in which a document file including an image with a small number of colors is printed. That is, it is possible to draw an image with high efficiency in a printing process for a document file in which both letters and an image with a small number of colors are edited, using a general document creation application.

The image processing apparatus 1 according to this embodiment converts raster data generated according to the data to be printed into the index colors and performs the drawing process with high efficiency. In addition, in this embodiment, a 1-BPP index color is treated and a zeroth index color in the index color table is fixed to white. Therefore, it is possible to allocate a color other than white, which is the zeroth color, as a first index color.

Figure 7:
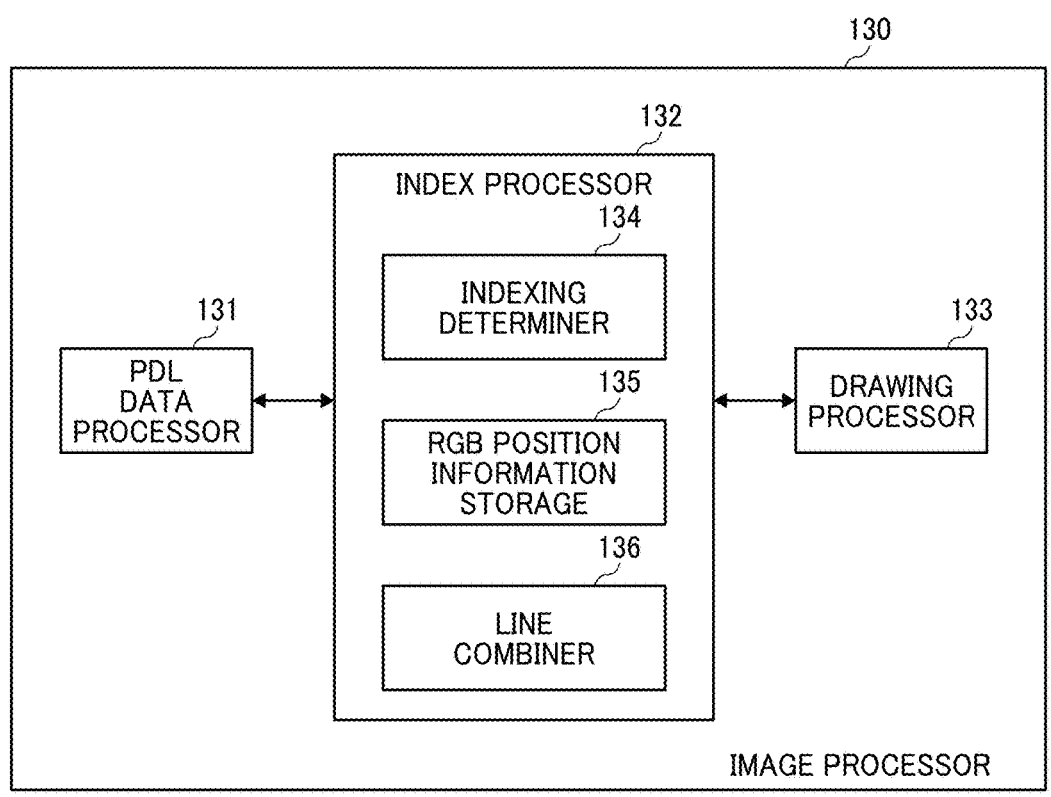
FIG. 7 is a block diagram illustrating the internal configuration of an image processor according to the first embodiment of the present disclosure.

Next, a function of drawing an image using the index colors to generate raster data, which is one of the functions implemented by, for example, the printing process in the image processing apparatus 1 according to this embodiment, will be described with reference to FIG. 7. FIG. 7 is a functional block diagram illustrating the configuration of the image processor 130 according to this embodiment. The image processor 130 includes a PDL data processor 131, an index processor 132, and a drawing processor 133.

The PDL data processor 131 converts PDL data in a raster format which has been input to the image processor 130 into an RGB image. When the data input to the image processor 130 is an RGB image, the process of the PDL data processor 131 may be omitted.

The index processor 132 converts the RGB image into an index image and an RGB image and inputs the index image and the RGB image to the drawing processor 133. The drawing processor 133 performs the drawing process on the data received from the index processor 132 to convert the data into CMYK data in a format that can be processed by the print engine 106. In addition, the drawing processor 133 performs the drawing process on the data to be printed to generate CMYK raster data.

The index processor 132 includes an indexing determiner 134, an RGB position information storage 135, and a line combiner 136. The indexing determiner 134 generates an index color image and a minimum RGB image for each line according to the RGB image input to the index processor 132.

Furthermore, the indexing determiner 134 controls a creation parameter indicating whether continuous RGB image data has been created. When an RGB image is generated, the indexing determiner 134 controls the creation parameter such that the creation parameter is "ON". The indexing determiner 134 controls the creation parameter such that the creation parameter is "OFF" which is a default value. The "continuous RGB image data" means RGB image data in which the pixels are continuous such that the coordinates of the pixels in the main scanning direction overlap each other.

In this embodiment, the "line" means one-dimensional array of pixels arranged in a specific one-dimensional direction in a two-dimensional pixel array developed according to the data to be printed.

The RGB position information storage 135 stores information indicating a pixel at a starting point and a pixel at an end point in the RGB image data among the pixels forming lines.

The line combiner 136 generates combined data which is data obtained by combining a plurality of lines of the index color image and the RGB image generated for each line.

The line combiner 136 generates an index color image block which is an index color image region obtained by combining a plurality of lines of the index color image and an RGB image data block which is an RGB image region obtained by combining a plurality of lines of the RGB image.

The line combiner 136 controls a creation parameter indicating whether the RGB image data block has been created. When the RGB image data block has been generated, the line combiner 136 controls the creation parameter such that the creation parameter is "ON". When the generation of the RGB image data block has ended, the line combiner 136 controls the creation parameter such that the creation parameter is "Done". In addition, the line combiner 136 controls the creation parameter such that the creation parameter is "OFF" which is a default value.

The drawing processor 133 performs the drawing process on each of the index color image block and the RGB image data block to convert each block into raster data in a format that can be processed by the print engine 106.

With this configuration, the image processing apparatus 1 according to this embodiment performs the drawing process on the received data to be printed (printing target data) to generate CMYK raster data. Next, the overall flow of the drawing process performed in the image processor 130 according to this embodiment will be described with reference to FIG. 8.

Figure 8:
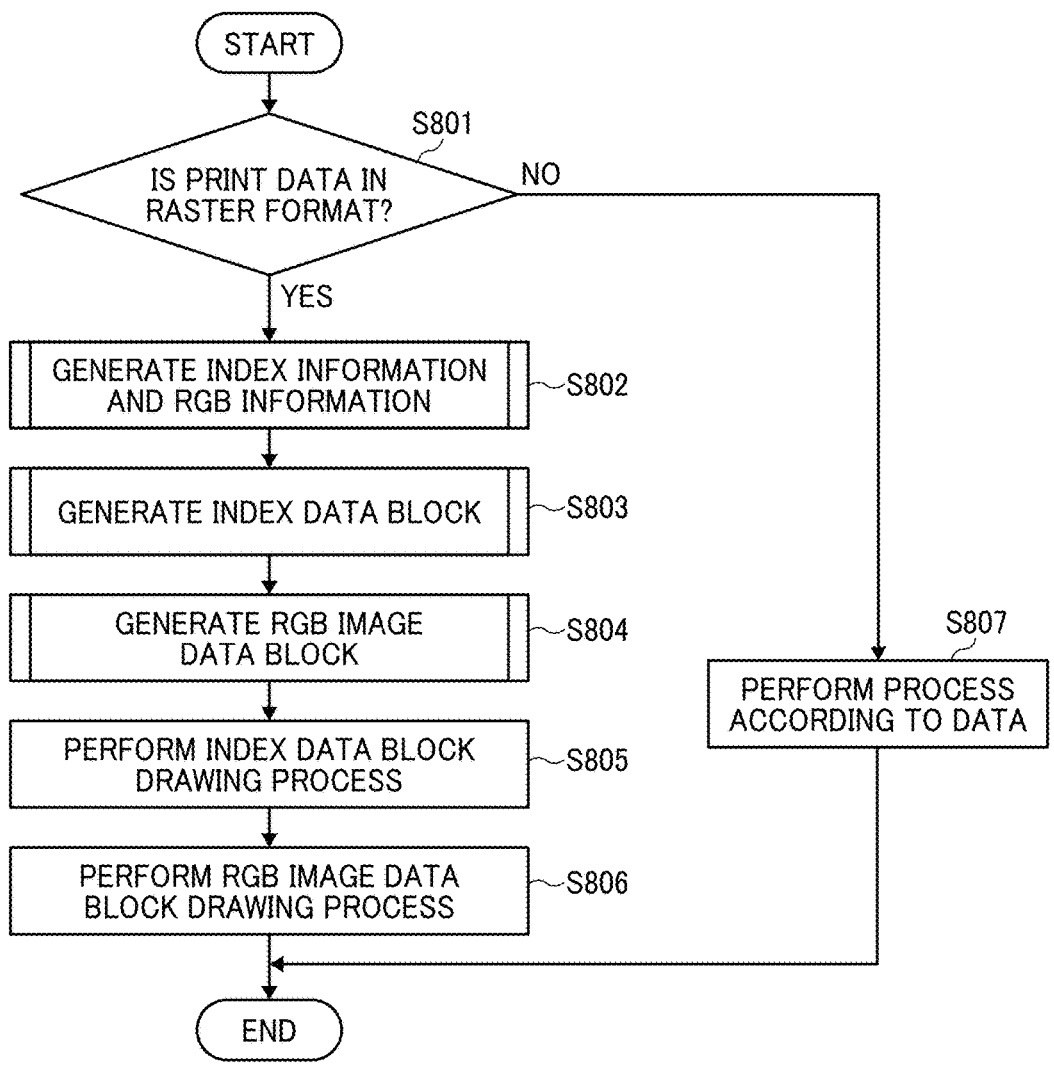
FIG. 8 is a flowchart illustrating the overall flow of a drawing process performed in the image processor according to the first embodiment of the present disclosure.
Figures 9, 10:
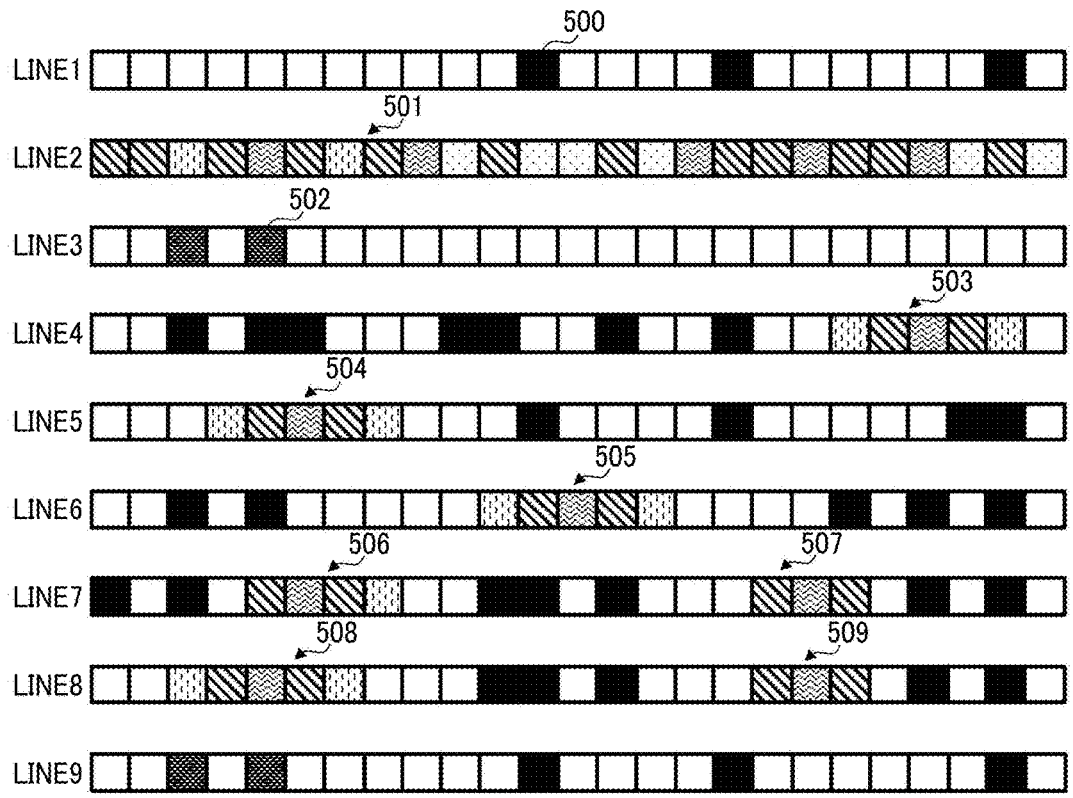
FIG. 9 is a diagram illustrating an index color image and an RGB image in printing target data according to the first embodiment of the present disclosure.
FIG. 10 is a diagram illustrating an example of the description of a definition file indicating the configuration of color information in lines included in the printing target data according to the first embodiment of the present disclosure.

In the process described in FIG. 8, the drawing process is performed for the printing target data illustrated in FIG. 9, using the index colors. FIG. 9 illustrates an index color image and an RGB image for each line in the printing target data according to this embodiment.

FIG. 9 illustrates lines 1 to 9 which are obtained by decomposing a two-dimensional pixel array developed according to the printing target data and each of which is a one-dimensional array of pixels arranged in a specific one-dimensional direction. Therefore, lines 1 to 9 are combined into one printing target data item.

FIG. 10 illustrates an example of the description of a definition file indicating the configuration of the color information of the lines in the printing target data illustrated in FIG. 9. Hereinafter, the configuration of the information of each line in FIG. 9 will be described in detail.

Line 1 is a line including only black text pixels 500 forming a black text. Therefore, since there are only pixels forming the black text pixels 500 in a white background, line 1 is expressed by while and black index colors. Line 2 is a line including only image pixels 501 forming an image.

Therefore, line 2 is not expressed by the index colors and a range from the head to the end of line 2 is stored as an RGB image.

Line 3 is a line including only red text pixels 502 forming a red text. Therefore, since there are only pixels forming the red text pixels 502 in the white background, line 3 is expressed by while and red index colors. Line 4 is a line in which the black text pixels 500 and image pixels 503 forming the image are mixed.

In this case, the black text pixel 500 is expressed by the white and black index colors and the image pixels 503 are stored as an RGB image. In addition, the position of the head which is the position of a pixel at a starting point of the RGB image and the position of the tail which is the position of a pixel at an end point of the RGB image are stored.

Line 5 is a line in which image pixels 504 forming the image and the black text pixels 500 are mixed. In this case, the black text pixel 500 is expressed by the white and black index colors and the image pixels 504 are stored as an RGB image.

Line 6 is a line in which the black text pixels 500 and image pixels 505 forming the image are alternately arranged. In this case, the black text pixel 500 is expressed by the white and black index colors and the image pixels 505 are stored as an RGB image. The positions of the head and the tail of the RGB image are stored.

Line 7 is a line in which the black text pixels 500 and image pixels 506 and 507 forming the image are alternately arranged. In this case, the black text pixel 500 is expressed by the white and black index colors and the image pixels 506 and 507 are stored as an RGB image.

In addition, the RGB image is stored on the basis of the position of the head of the image pixel 506 and the position of the tail of the image pixel 507. The black text pixels 500 expressed by the index colors remain at the leading end and the rear end of the line.

Line 8 is a line in which image pixels 508 and 509 forming the image and the black text pixels 500 are alternately arranged. In this case, the black text pixel 500 is expressed by the white and black index colors and the image pixels 508 and 509 are stored as an RGB image. The RGB image is stored on the basis of the positions of the head and the tail of the RGB image. The black text pixel 500 expressed by the index color remains behind the image pixel 509.

Line 9 is a line including the red text pixels 502 and the black text pixels 500. In this case, the black text pixel 500 is expressed by the index color and the red text pixel 502 is stored as an RGB image. The reason is that, in this embodiment, a 1-BPP index color is treated and one color except white is treated as the index color. Therefore, here, the black text pixel 500 is expressed by the index color in order to preferentially draw the black text pixel 500.

The image processing apparatus 1 according to this embodiment performs the drawing process on the printing target data illustrated in FIGS. 9 and 10, using the index colors. FIG. 8 is a flowchart illustrating the overall flow of the drawing process performed in the image processor 130 according to this embodiment.

The image processor 130 determines whether the received printing target data is PDL data in a raster format, that is, raster data (S801). When the image processor 130 determines that the printing target data is not PDL data in a raster format, that is, raster data (S801/NO), the drawing processor 133 performs the drawing process according to the received printing target data (S807) and generates CMYK raster data.

In this case, the image processor 130 performs the drawing process on all objects in the received printing target data.

When the received printing target data is PDL data in a raster format (S801/YES), the PDL data processor 131 converts the PDL data in the raster format into RGB image data and the indexing determiner 134 distinctively converts the RGB image data into an index image data and RGB image data for each line (S802). The flow of the detailed process in S803 will be described below.

When receiving the index image data and the RGB image data generated for each line, the line combiner 136 combines the lines that can be expressed by the same index color into a block and generates an index image block (S803). In addition, the line combiner 136 combines the lines of the RGB image data into the same block and generates an RGB image data block (S804).

The line combiner 136 performs an RGB boundary process of performing trimming such that the size of the RGB image data, that is, the size of the RGB image data block is the minimum in the process of S804. The flow of a detailed process in S803 and S804 will be described below.

The index processor 132 inputs the generated index image block and the generated RGB image data block to the drawing processor 133. The drawing processor 133 performs the drawing process on the index image block (S805) and performs the drawing process on the RGB image data block (S806) to generate CMYK raster data.

In the process of S803, for example, it is determined whether the pixels forming the line in which the black text pixels 500 and the image pixels 506 and 507 are alternately arranged, such as line 7 illustrated in FIG. 9, can be expressed by the index colors. Then, an index image using the index colors or RGB image data is generated according to the determination result.

Figure 11:
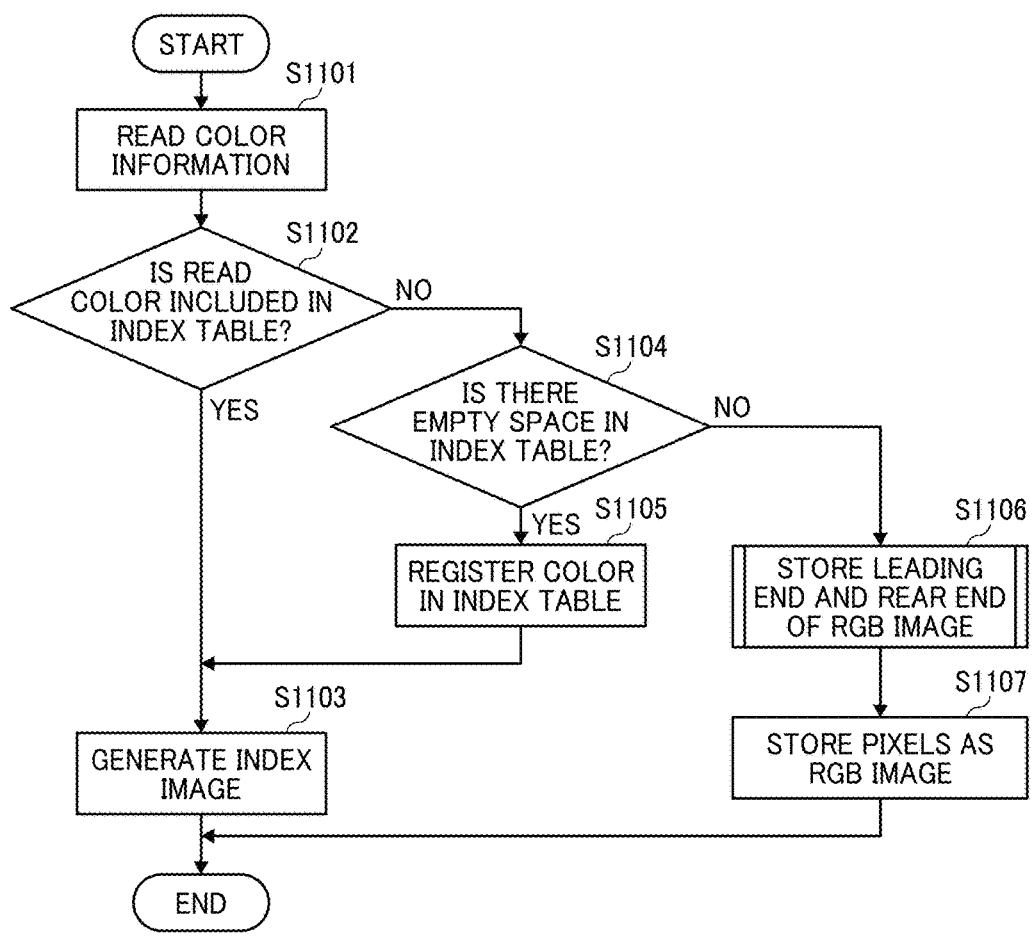
FIG. 11 is a flowchart illustrating the flow of a process of distinctively converting raster data into index color image data and an RGB image in the first embodiment of the present disclosure.

The flow of the process of distinctively converting the RGB image data into the index image data and the RGB image data in S802 will be described with reference to FIG. 11. FIG. 11 is a flowchart illustrating the flow of the process of distinctively converting the RGB image data into the index image data and the RGB image data in this embodiment.

The indexing determiner 134 reads the color information of each pixel forming lines (S1101) and determines whether the color information is identical to the color included in the index color table (S1102). When the color information is identical to the color included in the index color table (S1102/YES), the indexing determiner 134 generates an index image according to the index color table (S1103).

Specifically, the indexing determiner 134 describes pixel information using the color number that is identical to the color information of the pixel in the index color table to generate an index color image. When the color information is not identical to the color in the index color table (S1102/NO), the indexing determiner 134 determines whether there is an address at which the index color has not been registered in a storage region in which the index color table is stored (S1104).

When there is an address at which the index color has not been registered in the storage region in which the index color table is stored (S1104/YES), the indexing determiner 134 registers the color information of the pixel in a new index color table (S1105). Then, the same process as that in S1103 is performed. Therefore, the description of the process will not be repeated.

When there is no empty space in the index color table (S1104/NO), the color information of the pixel is unable to be described using the numbers in the index color table. In this case, the indexing determiner 134 stores the position of the pixel of which the color information is unable to be described using the numbers in the index color table (S1106) and temporarily stores the pixel as RGB image data in a storage region such as the RAM 20 (S1107).

In the process of S1106, the indexing determiner 134 temporarily stores the pixel, which is unable to be expressed by the index colors, as RGB image data in the storage region. Therefore, when the drawing processor 133 performs the drawing process according to the RGB image data, information for determining a pixel region of which the data is converted from RGB image data into CMYK raster data is required.

Therefore, in this embodiment, the RGB position information storage 135 stores information indicating a pixel at a starting point and a pixel at an end point in the RGB image data among the pixels forming lines. Next, the flow of a RGB position information storage process of storing RGB position information which is information indicating the pixel at the starting point and the pixel at the end point in the RGB image data will be described with reference to FIG. 12.

Figure 12:
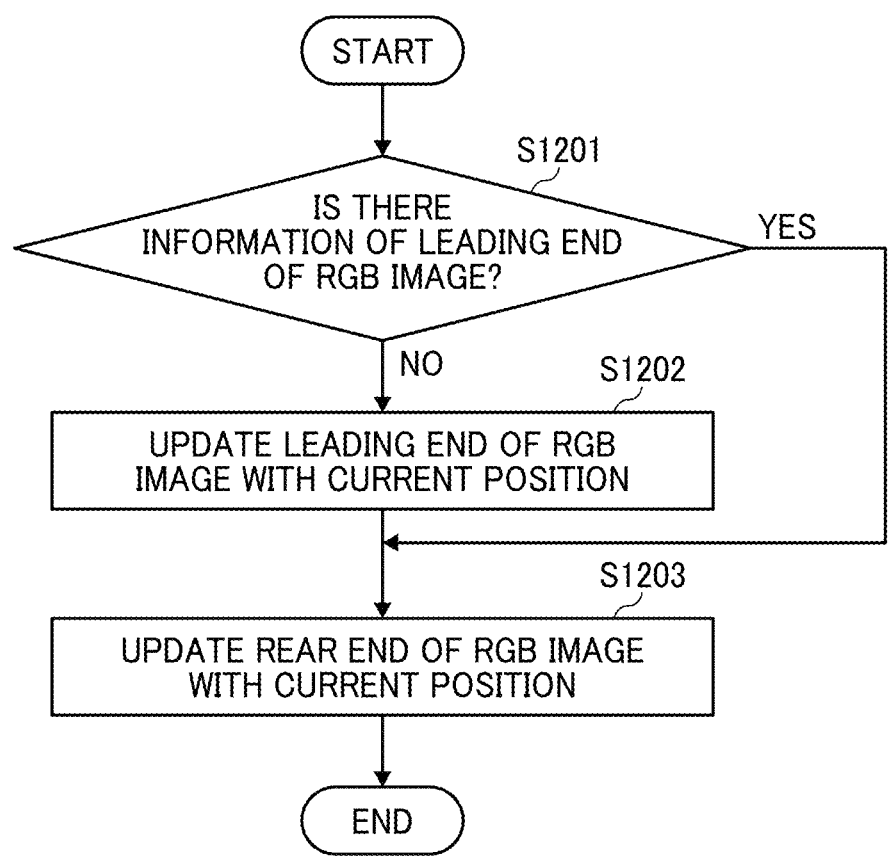
FIG. 12 is a flowchart illustrating the flow of an RGB position information storage process according to the first embodiment of the present disclosure.

FIG. 12 is a flowchart illustrating the flow of the RGB position information storage process according to this embodiment. When the indexing determiner 134 determines that the color information is unable to be described using the numbers in the index color table in the process of S1104, the RGB position information storage 135 determines whether the positional information of the pixel at the starting point in the RGB image data is present in the line (S1201). In this embodiment, the position information of the pixel at the starting position where the RGB image data starts is referred to as leading end position information.

When the leading end position information is present (S1201/YES), the RGB position information storage 135 updates the position of the pixel subjected to the process in S1104 with the positional information of the pixel at the end point in the RGB image data (S1203). In this embodiment, the positional information of the pixel at the end position where the RGB image data ends is referred to as rear end position information.

The indexing determiner 134 performs the process in S1104 for each pixel. Therefore, whenever the pixel of which the color information is unable to be described using the numbers in the index color table is present, the RGB position information storage 135 updates the rear end position information.

When the leading end position information is not present (S1201/NO), the RGB position information storage 135 updates the position of the pixel subjected to the process in S1104 with the leading end position information (S1202) and performs a process in S1203.

Figures 13, 14:
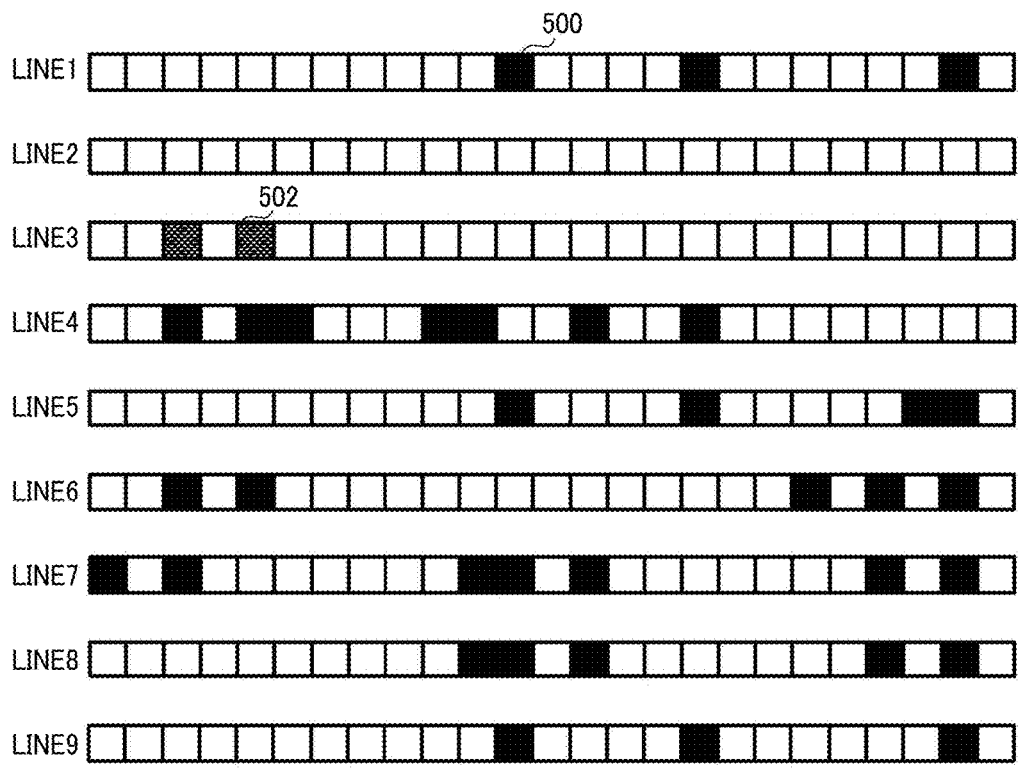
FIG. 13 is a diagram illustrating RGB position information in the printing target data in the first embodiment of the present disclosure.
FIG. 14 is a diagram illustrating a process of performing indexing determination for the printing target data and expressing the printing target data using the index colors in the first embodiment of the present disclosure.

The RGB position information storage 135 functions as a positional information storage that stores the RGB position information of all of the lines forming the printing target data. FIG. 13 illustrates the RGB position information of the printing target data according to this embodiment.

The RGB position information storage 135 stores, for example, the configuration of the index color table for expressing the color information of pixels forming each line which is illustrated in FIG. 9, information indicating whether RGB image data is present in each line, the leading end position information, and the rear end position information.

Figure 15:
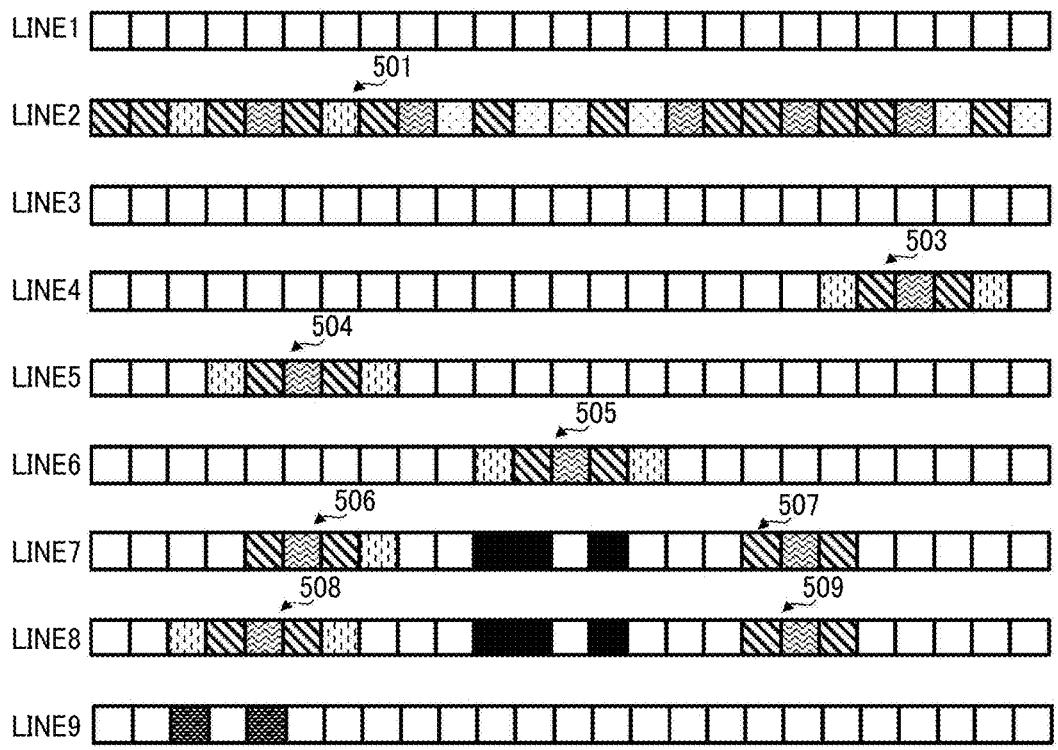
FIG. 15 is a diagram illustrating a process of performing indexing determination for the printing target data and expressing the printing target data using an RGB image in the first embodiment of the present disclosure.

FIG. 14 illustrates data obtained by performing an indexing determination process on the printing target data illustrated in FIG. 9 and expressing the printing target data with the index colors. FIG. 15 illustrates data obtained by performing an indexing determination process on the printing target data illustrated in FIG. 9 and expressing the printing target data with RGB image data.

In FIG. 15, the black text pixels 500 interposed between RGB image data items in line 7 or line 8 are represented by RGB image data according to the leading end position information and the rear end position information of the RGB image data. The RGB position information storage 135 according to this embodiment performs the RGB position information storage process on the lines forming the printing target data having the above-mentioned configuration.

Figure 16:
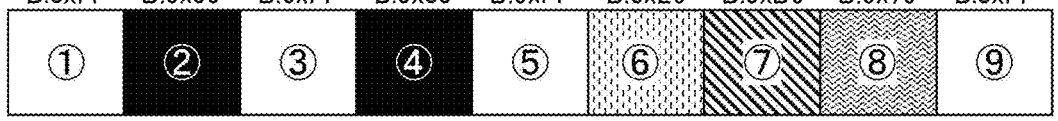
FIG. 16 is a diagram illustrating the configuration of pixels in a line in the first embodiment of the present disclosure.

It is assumed that the process of distinctively converting the printing target data into an index image and RGB image data and the RGB position information storage process according to this embodiment are performed for pixels of a line configured as illustrated in FIG. 16. In FIG. 16, the line is formed by first to ninth pixels.

In FIG. 16, the first to ninth pixels are represented by symbols in which numbers are described in circles and the color information of the RGB image data of each of the first to ninth pixels is represented by hexadecimal numbers. FIG. 17 is a diagram illustrating an update aspect of the RGB position information in this process.

The indexing determiner 134 performs the process of distinctively converting the printing target data into index image data and RGB image data in the order from the first pixel to the ninth pixel. The RGB position information storage 135 performs the RGB position information storage process in the order from the first pixel to the ninth pixel.

The color information of the RGB image data of the first pixel is represented by "R=G=B=0xFF". In addition, since the number 0 in the index color table is fixed to "R=G=B=0xFF", the indexing determiner 134 describes the color information of the first pixel, using the number "0" in the index color table.

The color information of the RGB image data of the second pixel is represented by "R=G=B=0x00". Therefore, the indexing determiner 134 checks whether there is an empty space in the index color table. In this case, the number 1 in the index color table is empty, the indexing determiner 134 newly registers "R=G=B=0x00" to the number 1 in the index color table and describes the color information of the second pixel using the number "1" in the index color table.

The color information of the RGB image data of the third pixel is represented by "R=G=B=0xFF". Since the number 0 in the index color table is "R=G=B=0xFF", the indexing determiner 134 describes the color information of the third pixel using the number "0" in the index color table.

The color information of the RGB image data of the fourth pixel is represented by "R=G=B=0x00". Since the number 1 in the index color table is "R=G=B=0x00", the indexing determiner 134 describes the color information of the fourth pixel using the number "1" in the index color table.

The color information of the RGB image data of the fifth pixel is represented by "R=G=B=0xFF". Since the number 0 in the index color table is "R=G=B=0xFF", the indexing determiner 134 describes the color information of the fifth pixel using the number "0" in the index color table.

The color information of the RGB image data of the sixth pixel is represented by "R=0x9D, G=0xC3, B=0xE6". In this case, since there is no empty space in the index color table, the color information of the sixth pixel is unable to be described using the numbers in the index color table.

Therefore, the indexing determiner 134 temporarily stores the sixth pixel as RGB image data. Since the leading end position information has not been registered in the RGB position information, the RGB position information storage 135 registers the leading end position information, using the sixth pixel as the starting point of the RGB image data.

The color information of the RGB image data of the seventh pixel is represented by "R=0x2E, G=0x75, B=0xB6". In this case, since there is no empty space in the index color table, the color information of the seventh pixel is unable to be described using the numbers in the index color table.

Therefore, the indexing determiner 134 temporarily stores the seventh pixel as RGB image data. Since the leading end position information has been registered in the RGB position information, the RGB position information storage 135 registers the rear end position information, using the seventh pixel as the end point of the RGB image data.

The color information of the RGB image data of the eighth pixel is represented by "R=0x1F, G=0x4E, B=0x79". In this case, since there is no empty space in the index color table, the color information of the eighth pixel is unable to be described using the numbers in the index color table.

Therefore, the indexing determiner 134 temporarily stores the eighth pixel as RGB image data. Since the leading end position information has been registered in the RGB position information, the RGB position information storage 135 upgrades the rear end position information, using the eighth pixel as the end point of the RGB image data.

The color information of the RGB image data of the ninth pixel is represented by "R=G=B=0xFF". Since the number 0 in the index color table is "R=G=B=0xFF", the indexing determiner 134 describes the color information of the ninth pixel using the number "0" in the index color table.

As described above, the indexing determiner 134 and the RGB position information storage 135 perform the process of distinctively converting the printing target data into index image data and RGB image data and the RGB position information storage process on the line illustrated in FIG. 16, respectively. Then, as illustrated at the lowest end of FIG. 17, information indicating the index color table in which the zeroth and first index colors are registered and an index image represented by "010100000" is generated.

In addition, as illustrated at the lowest end of FIG. 17, in the RGB position information, the leading end position information is "6" and the rear end position information is "8". Therefore, the process of converting RGB data into CMYK data using the index colors is not performed for the sixth to eighth pixels in the index image represented by "010100000".

As described above, the indexing determiner 134 determines whether it is possible to represent color information with the index colors, according to the color information of each of the pixels forming the lines of the printing target data. The image processing apparatus 1 according to this embodiment performs a process of drawing the printing target data with high efficiency according to the determination result.

Figure 18:
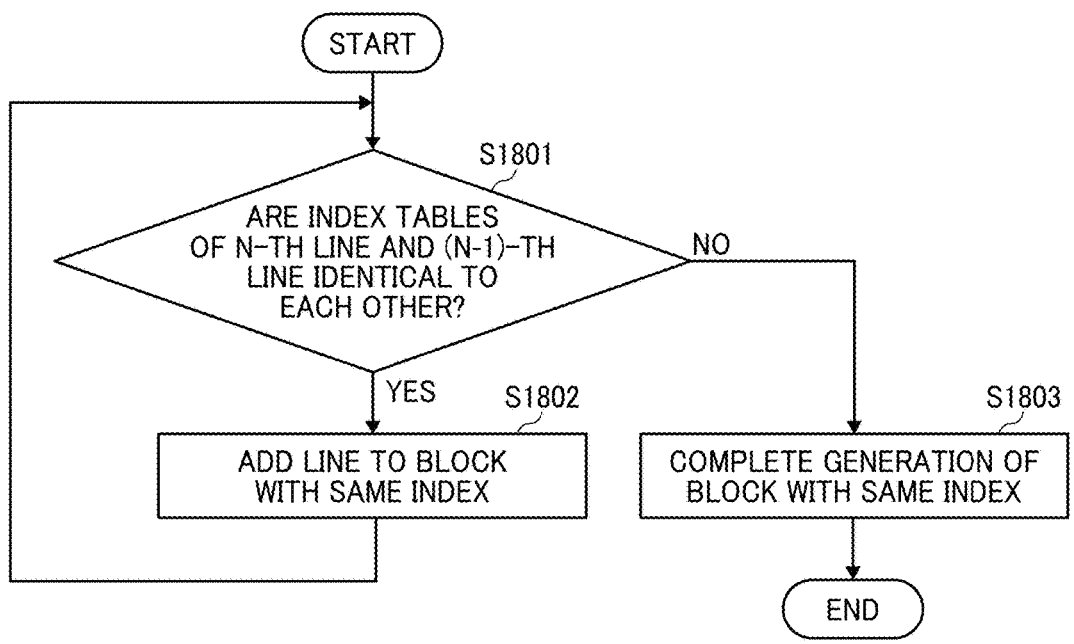
FIG. 18 is a flowchart illustrating the flow of a process of combining the lines expressed by the index colors in the first embodiment of the present disclosure.

Next, the flow of a process of combining the lines expressed by the index colors into a block will be described with reference to FIG. 18. FIG. 18 is a flowchart illustrating the flow of the process of combining the lines expressed by the index colors in this embodiment. The process in S803 is performed according to steps in the flowchart illustrated in FIG. 18.

The line combiner 136 determines whether an index color table of a line (line N), which is a processing target, is identical to an index color table of a line (line N−1) immediately before the current line (S1801).

When the index color tables of the line N and the line N−1 are identical to each other (S1801/YES), the line combiner 136 combines the line N and the line N−1 to generate an index image block in which color information can be described by the same index color table (S1802).

When the index color tables of the line N and the line N−1 are not identical to each other (S1801/NO), the line combiner 136 ends the index image block generation process (S1803). As described above, the line combiner 136 determines whether to combine the line N and the line N−1 on the basis of the expression aspect of the color information.

Figure 19:
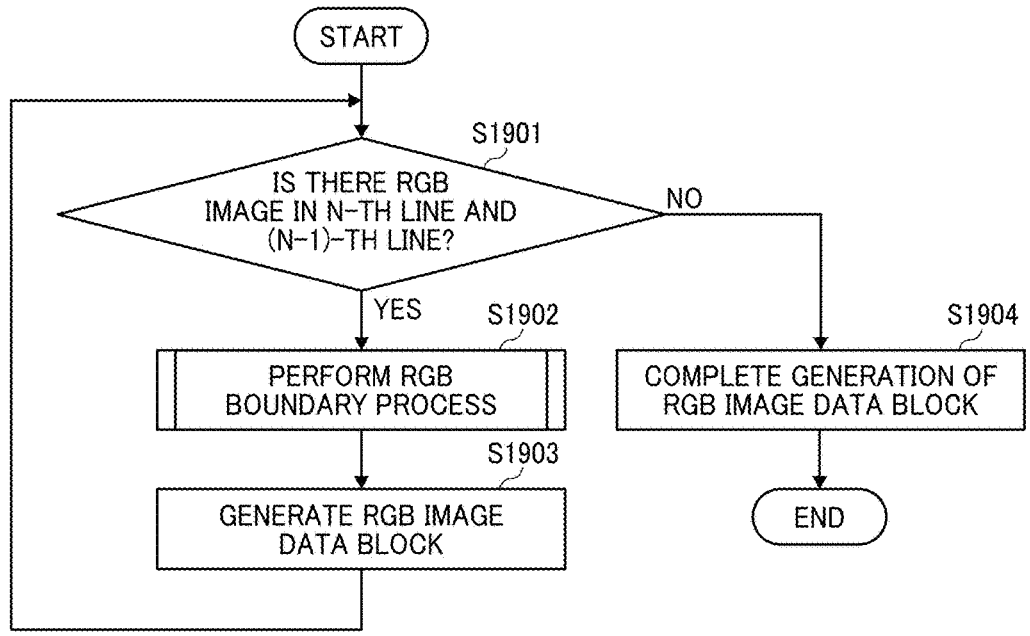
FIG. 19 is a flowchart illustrating the flow of a process of combining the lines expressed by the RGB image in the first embodiment of the present disclosure.

Similarly to the index image block, an RGB image data block is generated for RGB image data. FIG. 19 is a flowchart illustrating the flow of a process of combining the lines expressed by RGB image data in this embodiment. The process in S804 is performed according to steps in the flowchart illustrated in FIG. 19.

The line combiner 136 determines whether RGB image data is included in the current line (line N) and the line (line N−1) immediately before the current line (S1901). When the RGB image data is included in the line N and the line N−1 (S1901/YES), the line combiner 136 performs an RGB boundary process of aligning the leading end and the rear end of the RGB image data included in each of the line N and the line N−1 according to the leading end position information and the rear end position information (S1902).

The line combiner 136 combines the line N and the line N−1 subjected to the RGB boundary process to generate an RGB image data block (S1903). When the RGB image data is not included in the line N and the line N−1 (S1901/NO), the line combiner 136 ends the process of combining the lines expressed by the RGB image data (S1904).

As such, the line combiner 136 determines whether to combine the line N and the line N−1 on the basis of the expression aspect of the color information, that is, on the basis of whether the color information of the pixels forming the line N and the line N−1 indicates RGB colors or the index colors.

Figure 20:
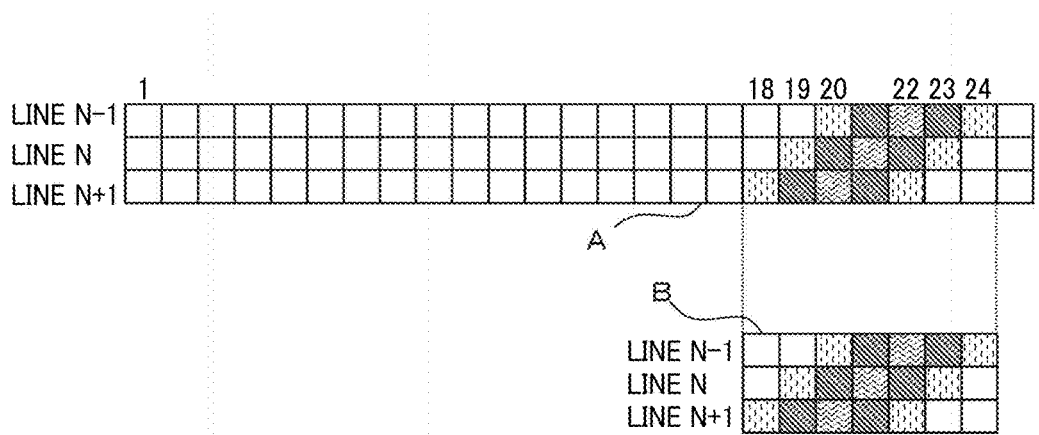
FIG. 20 is a diagram illustrating the RGB position of each line in the first embodiment of the present disclosure.

In the line combination process according to this embodiment, it is necessary to reduce the missing of the pixel to be converted from RGB image data into CMYK data. Therefore, as represented by letter A in FIG. 20, the line combiner 136 determines a line with the leading end position information having the shortest distance from the first pixel among the lines, on the basis of the leading end position information of each line.

In addition, the line combiner 136 determines a line with the rear end position information having the longest distance from the first pixel among the lines, on the basis of the rear end position information of each line. As represented by letter B in FIG. 20, the line combiner 136 determines a region in which RGB image data is converted into CMYK data. Then, the line combiner 136 performs the RGB boundary process on the determined region.

That is, the line combiner 136 determines the boundary of the region in which RGB image data is converted into CMYK data, on the basis of the leading end position information having the shortest distance from the first pixel in the line and the rear end position information having the longest distance from the first pixel in the line. In this embodiment, the boundary of the region in which RGB image data is converted into CMYK data is determined, using the first pixel in the line, which is a pixel at a predetermined position, as a reference point. However, other pixels may be used as the reference point.

Then, the drawing processor 133 performs the drawing process on the region in which RGB image data is converted into CMYK data to generate raster data in which the color information expressed by R, G, and B is reliably reflected in CMYK values.

Figures 21, 22:
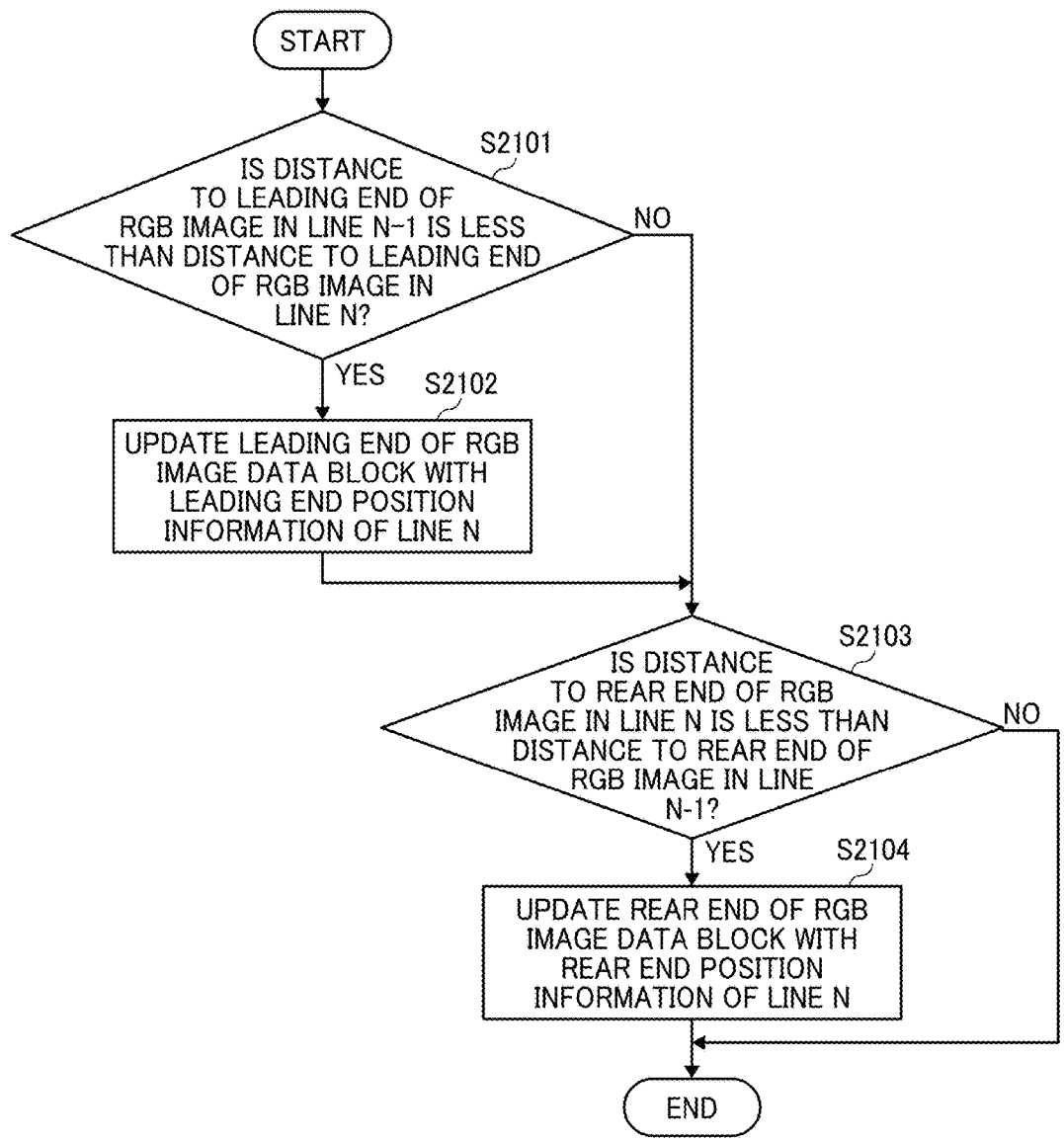
FIG. 21 is a flowchart illustrating the flow of an RGB boundary process in the first embodiment of the present disclosure.
FIG. 22 is a diagram illustrating color information in each line of an RGB image data block in the first embodiment of the present disclosure.

FIG. 21 is a flowchart illustrating the flow of the RGB boundary process according to this embodiment. The line combiner 136 compares the leading end position information of the line N with the leading end position information of the line N−1 (S2101). For the distance from the first pixel in the line, when a pixel distance indicated by the leading end position information of the line N is shorter than a pixel distance indicated by the leading end position information of the line N−1 (S2101/YES), the line combiner 136 aligns the leading end of the RGB image data block with the leading end position information of the line N and updates the leading end position information (S2102).

FIG. 22 illustrates an example of the color information of each line in the RGB image data block in this embodiment. As illustrated in FIG. 22, in the line N−1, the starting point of the RGB image data is the twentieth pixel and the end point of the RGB image data is the twenty-fourth pixel.

In the line N, the starting point of the RGB image data is the nineteenth pixel and the end point of the RGB image data is the twenty-third pixel. In the line N+1, the starting point of the RGB image data is the eighteenth pixel and the end point of the RGB image data is the twenty-second pixel. The line combiner 136 performs the RGB boundary process on the RGB image data block having this configuration.

For the distance from the first pixel in the line, when a pixel distance indicated by the leading end position information of the line N is longer than a pixel distance indicated by the leading end position information of the line N−1 (S2101/NO) or after the process in S2102, the line combiner 136 compares the rear end position information of the line N with the rear end position information of the line N−1 (S2103).

For the distance from the first pixel in the line, when a pixel distance indicated by the rear end position information of the line N is longer than a pixel distance indicated by the rear end position information of the line N−1 (S2103/YES), the line combiner 136 aligns the rear end of the RGB image data block with the rear end position information of the line N and updates the rear end position information (S2104).

For the distance from the first pixel in the line, when the pixel distance indicated by the rear end position information of the line N is shorter than the pixel distance indicated by the rear end position information of the line N−1 (S2103/NO) or after the process in S2104, the line combiner 136 ends this process.

As such, the region in which RGB image data is converted into CMYK data is determined on the basis of the leading end position information and the rear end position information of each line in the combined RGB image data block. As represented by B in FIG. 20, it is possible to reduce the missing of the pixels converted from RGB image data to CMYK data in the RGB image data block subjected to the RGB boundary process.

As described above, the image processing apparatus 1 according to this embodiment determines whether the entire raster data of one page can be expressed by the index colors and generates CMYK raster data in the region that can be indexed, using the index colors. In addition, the image processing apparatus 1 performs a process of determining the boundary between RGB image data and an index image in the region that is not capable of being indexed such that there is no missing of the pixels to be converted from RGB image data to CMYK raster data.

Figure 23:
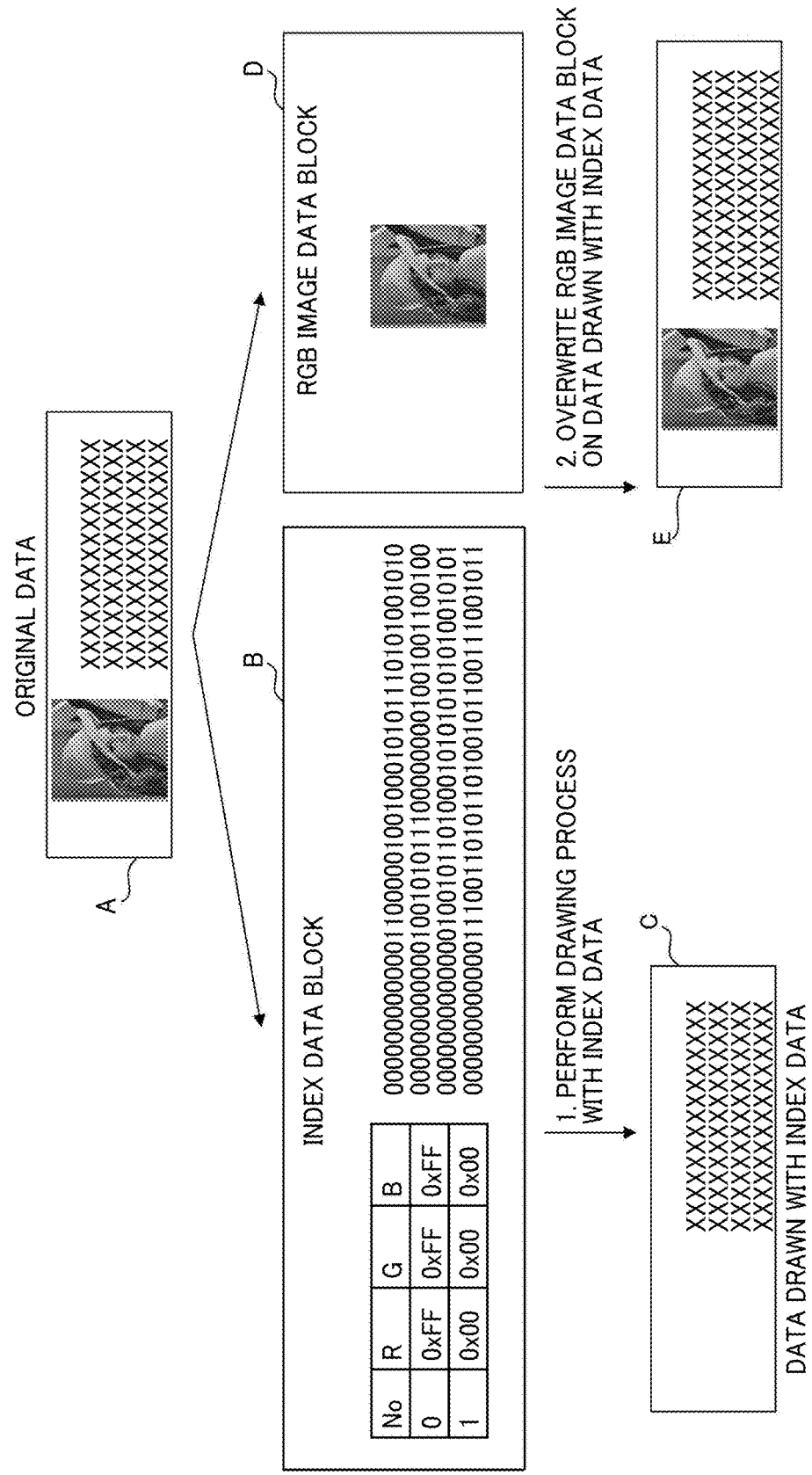
FIG. 23 is a diagram illustrating an aspect of the drawing process in the first embodiment of the present disclosure.

Therefore, as represented by letter A in FIG. 23, for the printing target data in which each page is entirely expressed in a raster data format, it is possible to distinctively perform the drawing process on a region which is drawn using the index colors as represented by letter B in FIG. 23 and a region in which RGB image data is converted into CMYK raster data as represented by letter D in FIG. 23.

The image processor 130 overwrites the region (represented by letter D in FIG. 23) in which RGB image data is converted into CMYK raster data on the region (represented by letter C in FIG. 23) which is drawn using the index colors to generate CMYK raster data (represented by letter E in FIG. 23) which can be used by the print engine 106.

In recent years, an expressing method using PDL has been proposed that expresses all printing data of one page in raster data format. When a WORD document file is converted to a PDL format using such an expressing method, raster data are created without distinguishing a plurality of objects constituting the WORD document file. Since the objects are not distinguished from each other, a drawing process is performed on all raster data of one page, which may hamper effective drawing process.

As described above, the image processing apparatus 1 according to this embodiment can reduce the data size of an image, reduce the processing time, and print, for example, a Word document file including an image with a small number of colors with high efficiency, using the index colors. In addition, it is possible to apply this process, without distinguishing objects included in the page to be printed. Therefore, a region having a large number of colors and a region using the index colors are separately drawn.

At that time, drawing is performed at the boundary between the region having a large number of colors and the index color region such that the missing of the pixels converted from RGB image data to CMYK raster data does not occur. Therefore, it is possible to reduce the possibility of image missing in the drawing result of the boundary between the region having a large number of colors and the index color region.

Second Embodiment

In this embodiment, the flow of a process when there is a page in which a plurality of regions, each of which includes color information that is unable to be expressed by the index colors, are present in a main scanning direction on the same line will be described. An image processing system 5 according to this embodiment has the same configuration as the image processing system according to the first embodiment and an image processing apparatus 1, a PC 2, and a tablet terminal 3 have the same hardware configuration and functional configuration as the image processing apparatus 1, the PC 2, and the tablet terminal 3 according to the first embodiment. The description of the hardware configuration and the functional configuration will not be repeated.

Figure 24:
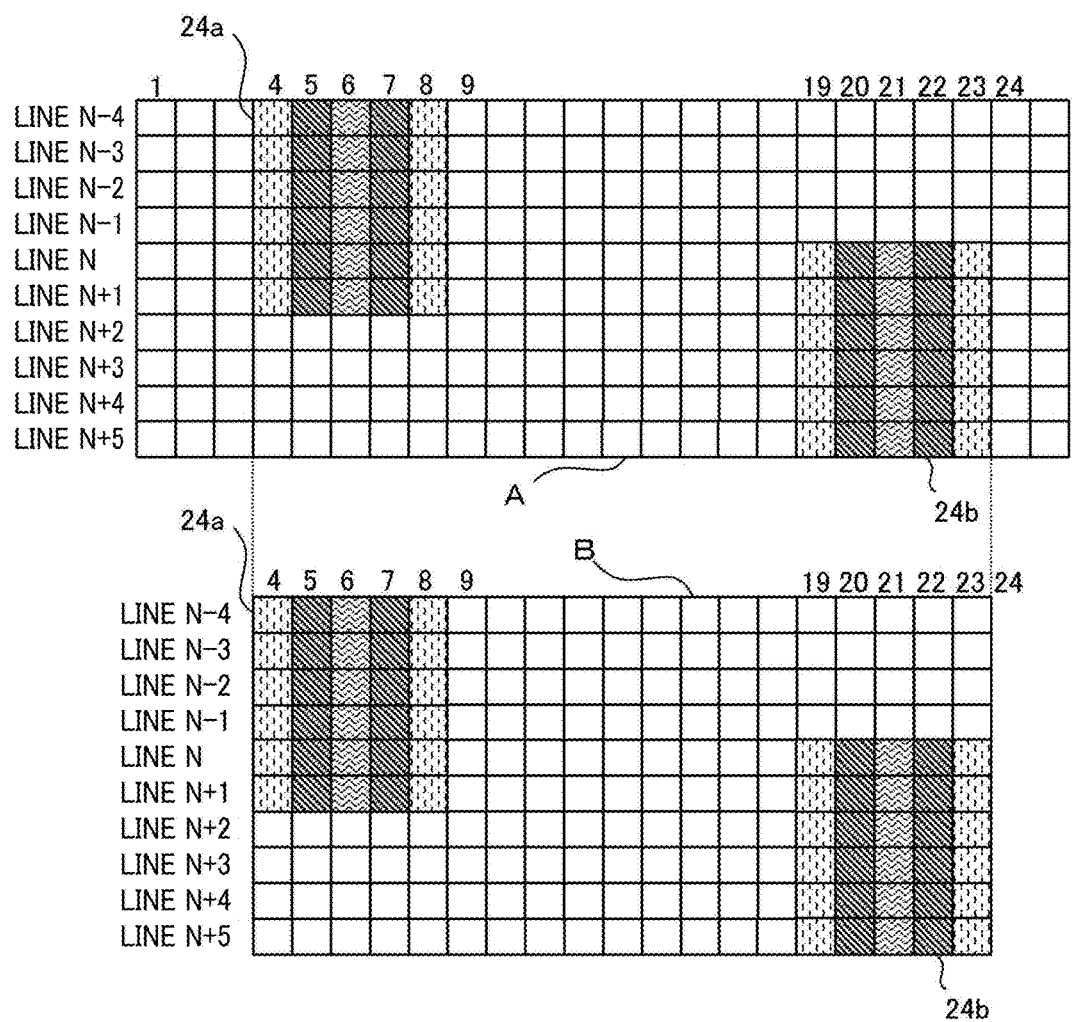
FIG. 24 is a diagram illustrating the RGB position of each line in a second embodiment of the present disclosure.

In FIG. 24, letter A indicates the RGB position information of raster data of a printing target page in which a plurality of regions, each of which includes color information that is unable to be expressed by the index colors, are present in the main scanning direction on the same line and letter B indicates RGB image data which is generated by an RGB boundary process according to the leading end position information and the rear end position information of the raster data represented by letter A in FIG. 24.

FIG. 25 is a diagram illustrating the RGB position information of the printing target data according to this embodiment. The RGB position information storage 135 stores the configuration of an index color table for expressing the color information of pixels forming each line illustrated in FIG. 25, information indicating whether RGB image data is present in each line, the leading end position information, and the rear end position information.

As represented by letter A in FIG. 24, the raster data according to this embodiment includes continuous RGB image data 24a and continuous RGB image data 24b in which the pixels of RGB image data are continuous on the same line, that is, the pixels are continuous such that the coordinates of the pixels overlap each other in the main scanning direction. In the RGB position information illustrated in FIG. 25, continuous RGB image data items, such as the continuous RGB image data 24a and the continuous RGB image data 24b, are present in a "line N" and a "line N+1".

When the RGB boundary process according to the first embodiment is performed for the printing target data, a region that can be drawn using the index colors between the continuous RGB image data 24a and the continuous RGB image data 24b is also expressed as an RGB image, as represented by letter B in FIG. 24. Therefore, the region that is not required to be expressed as an RGB image is expressed as an RGB image, which results in an increase in data size.

For this reason, in this embodiment, an RGB image data block drawing process is performed in order to further reduce the data size and to generate an RGB image data block. Next, the flow of the process according to this embodiment will be described with reference to the drawings.

Figure 26:
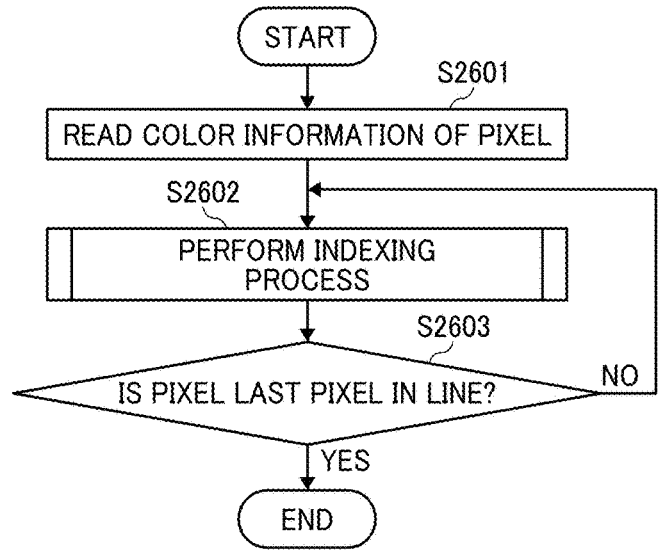
FIG. 26 is a flowchart illustrating the flow of an indexing process in the second embodiment of the present disclosure.

FIG. 26 is a flowchart illustrating the flow of a printing target data indexing process according to this embodiment. In this embodiment, in the following description, it is assumed that the printing target data received by the image processor 130 is raster data.

The indexing determiner 134 reads the color information of each pixel forming lines (S2601) and performs the indexing process (S2602). Then, the indexing determiner 134 performs the indexing process on all of the lines included in the printing target data (S2603/YES) and generates RGB image data and index image data.

Figure 27:
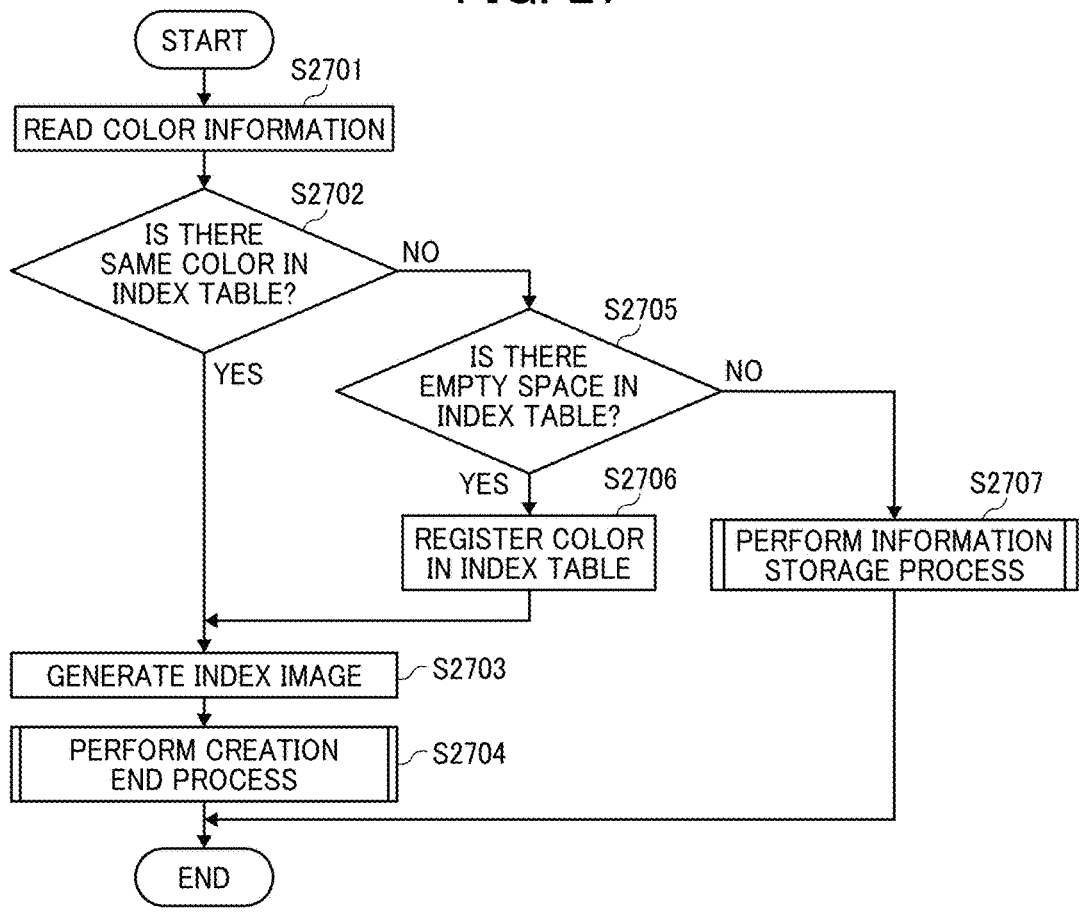
FIG. 27 is a flowchart illustrating the flow of a process of distinctively converting raster data into index color image data and an RGB image in the second embodiment of the present disclosure.

Next, the flow of the indexing process performed in S2602 will be described with reference to FIG. 27. FIG. 27 is a flowchart illustrating the flow of the indexing process according to this embodiment. The indexing process according to this embodiment means a process that generates an index color image and an RGB image for each line.

The indexing determiner 134 reads the color information of each pixel forming lines (S2701) and determines whether the color information is identical to the color included in the index color table (S2702). When the color information is identical to the color included in the index color table (S2702/YES), the indexing determiner 134 generates an index color image according to the index color table (S2703).

Specifically, the indexing determiner 134 describes pixel information, using the number corresponding to the color identical to the color information of the pixel in the index color table, and generates an index color image. Then, the indexing determiner 134 performs a creation end process on the pixel (S2704). The creation end process will be described in detail below.

When the color information is not identical to the color included in the index color table (S2702/NO), the indexing determiner 134 determines whether an address at which the index color has not been registered is present in the storage region storing the index color table (S2705).

When an address at which the index color has not been registered is present in the storage region storing the index color table (S2705/YES), the indexing determiner 134 newly registers the color information of the pixel in the index color table (S2706). Then, the same process as the process in S2703 is performed and the description of the process will not be repeated.

When there is no empty space in the index color table (S2705/NO), the color information of the pixel is unable to be described, using the numbers in the index color table. In this case, the indexing determiner 134 performs an information storage process, using the pixel of which the color information is unable to be described by the numbers in the index color table as RGB image data (S2707). The information storage process will be described in detail below.

In the process of S2707, the indexing determiner 134 temporarily stores the pixel, which is unable to be expressed by the index colors, as RGB image data in the storage region. Therefore, when the drawing processor 133 performs a drawing process according to the RGB image data, information indicating a pixel region that is converted from RGB image data into CMYK raster data is required.

Therefore, in this embodiment, the RGB position information storage 135 stores information indicating a pixel at a starting point and a pixel at an end point in the RGB image data among the pixels forming lines in each of the continuous RGB image data 24a and the continuous RGB image data 24b, as illustrated in FIG. 25. Next, the flow of a position information storage process of storing RGB position information which is information indicating the pixel at the starting point and the pixel at the end point in the RGB image data will be described with reference to FIG. 28.

Figure 28:
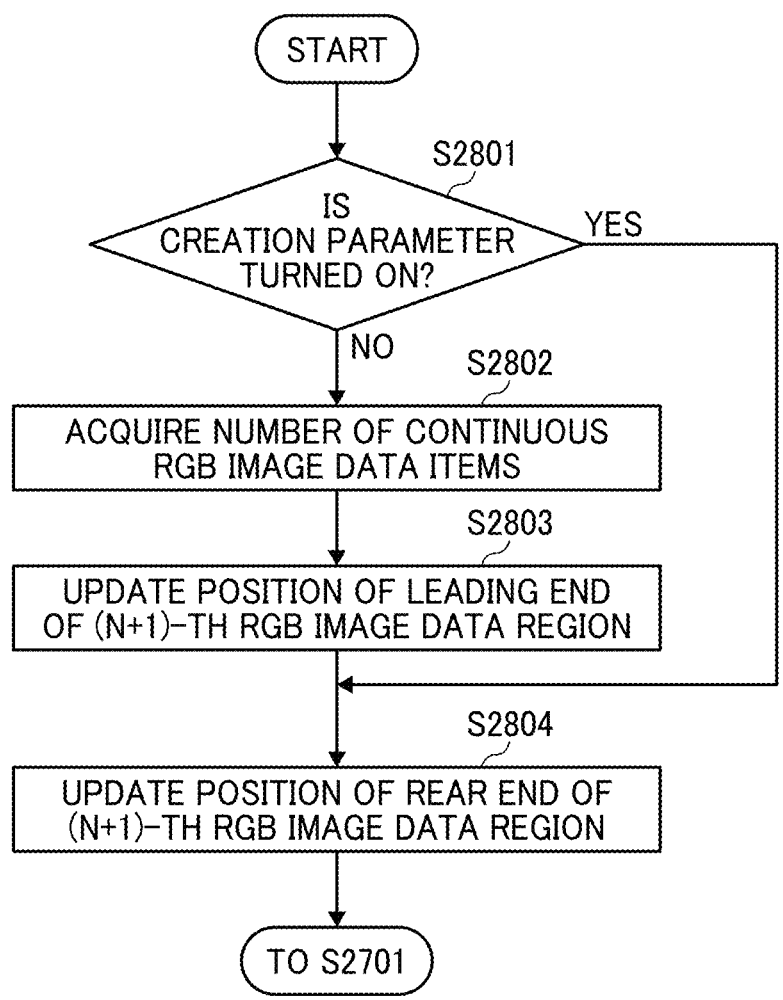
FIG. 28 is a flowchart illustrating the flow of an information storage process in the second embodiment of the present disclosure.

FIG. 28 is a flowchart illustrating the flow of the RGB position information storage process according to this embodiment. When the indexing determiner 134 determines that the color information is unable to be described by the numbers in the index color table in the process of S2705, the RGB position information storage 135 determines whether a creation parameter indicating whether continuous RGB image data has been created is "ON" (S2801).

When the continuous RGB image data is not being created, that is, when the creation parameter is "OFF" (S2801/NO), the indexing determiner 134 and the RGB position information storage 135 perform processes for a pixel at the leading end of an RGB image data region. The RGB position information storage 135 acquires the number of RGB image data regions (S2802) and starts to create the RGB image data regions.

When the number of RGB image data regions acquired in S2802 is N, the RGB position information storage 135 starts to create the RGB image data regions from an (N+1)-th RGB image data region. The reason is that an N-th RGB image data region has already been created and the number of RGB image data regions increases when a new RGB image region is created.

The RGB position information storage 135 updates the position of the pixel of which the color information has been read in the process of S2701 with the position of the leading end of the (N+1)-th RGB image data region (S2803). Then, the RGB position information storage 135 updates the position of the pixel of which the color information has been read in the process of S2701 with the position of the rear end of the (N+1)-th RGB image data region (S2804).

When the RGB position information storage 135 updates the position of the rear end of the (N+1)-th RGB image data region, the indexing determiner 134 performs a series of processes from S2701 for the next pixel again.

When the continuous RGB image data is being created, that is, when the creation parameter is "ON" (S2801/YES), the indexing determiner 134 and the RGB position information storage 135 perform the processes for the pixel included in the RGB image data region or the pixel at the rear end of the RGB image data region. In this case, the RGB position information storage 135 updates the position of the pixel of which the color information has been read in the process of S2701 with the position of the rear end of the (N+1)-th RGB image data region (S2804).

When the RGB position information storage 135 updates the position of the rear end of the (N+1)-th RGB image data region, the indexing determiner 134 performs a series of processes from S2701 for the next pixel again.

Figure 29:
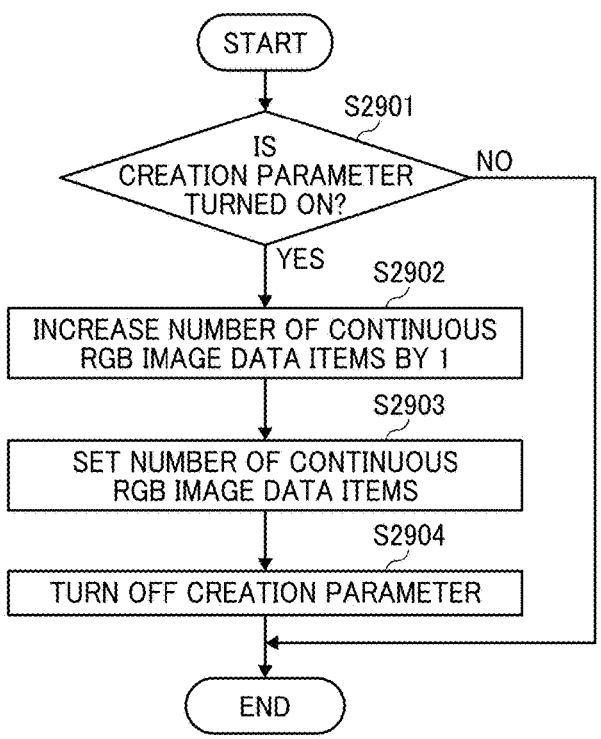
FIG. 29 is a flowchart illustrating the flow of a creation end process in the second embodiment of the present disclosure.

Next, a process when index image data is generated in the index processor 132 will be described according to steps in the flowchart illustrating the creation end process in FIG. 29.

For example, when a pixel subsequent to the pixel expressed by an RGB image is index image data, index image data is not included in the RGB image data block in this embodiment.

The RGB position information storage 135 determines whether the creation parameter indicating whether continuous RGB image data has been created is "ON" (S2901). When the creation parameter is "ON" (S2901/YES), the indexing determiner 134 and the RGB position information storage 135 perform the processes for a pixel to be processed that is index image data and is subsequent to the pixel which is RGB image data.

The RGB position information storage 135 increases the value of the number of RGB image data regions in the line that is being processed by 1 (S2902) and sets the value of the number of RGB image data regions (S2903). The indexing determiner 134 controls the creation of the RGB image data region such that the creation is "OFF" (S2904) and ends this process.

When the creation parameter is "OFF" (S2901/NO), the indexing determiner 134 ends this process. In this case, the indexing determiner 134 and the RGB position information storage 135 perform the processes for the next processing target pixel among the pixels in which index image data is continuous.

When the information storage process on each line forming the image data ends, the line combiner 136 generates an index color image block which is an index color image region obtained by combining a plurality of lines of the index color image and an RGB image data block which is RGB image data obtained by combining a plurality of lines of the RGB image.

Figure 30:
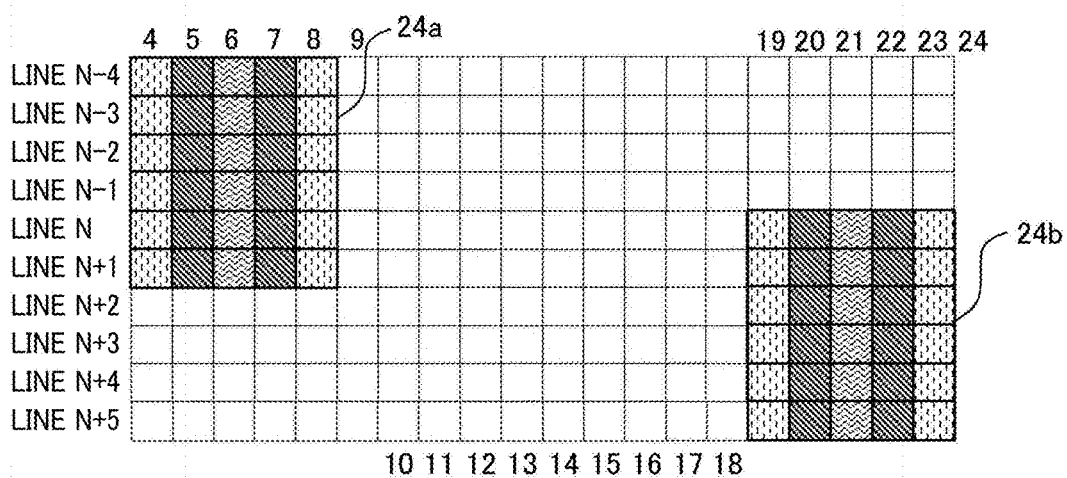
FIG. 30 is a diagram illustrating an RGB image data block in the second embodiment of the present disclosure.
Figures 31, 32:
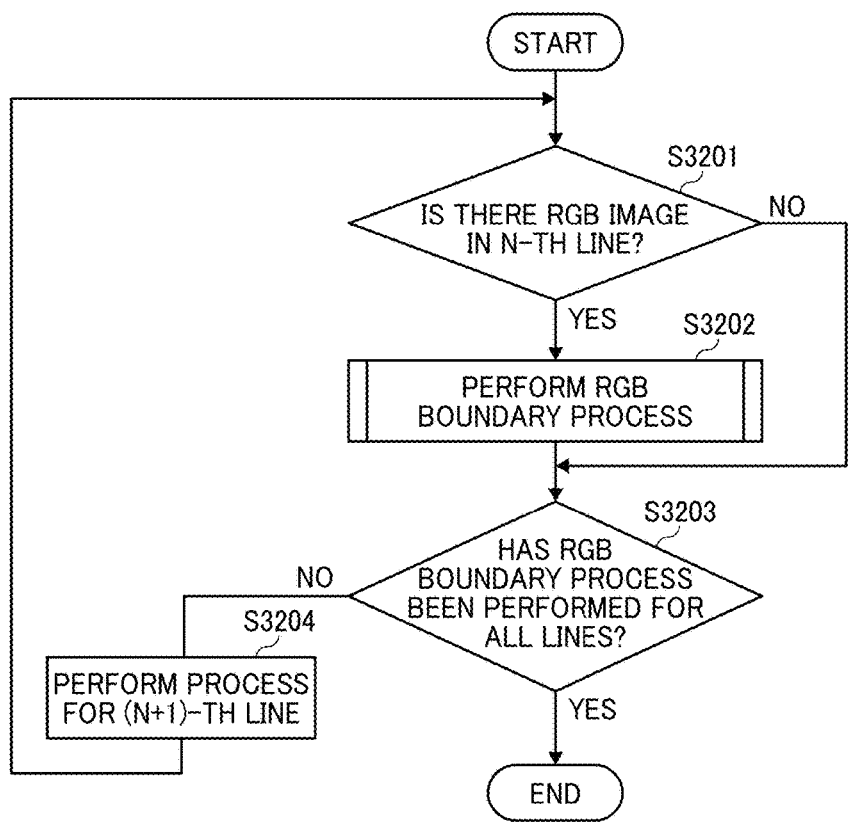
FIG. 31 is a diagram illustrating information indicating the RGB image data block in the second embodiment of the present disclosure.
FIG. 32 is a flowchart illustrating the flow of a process of combining the lines expressed by the RGB image in the second embodiment of the present disclosure.
Figure 33:
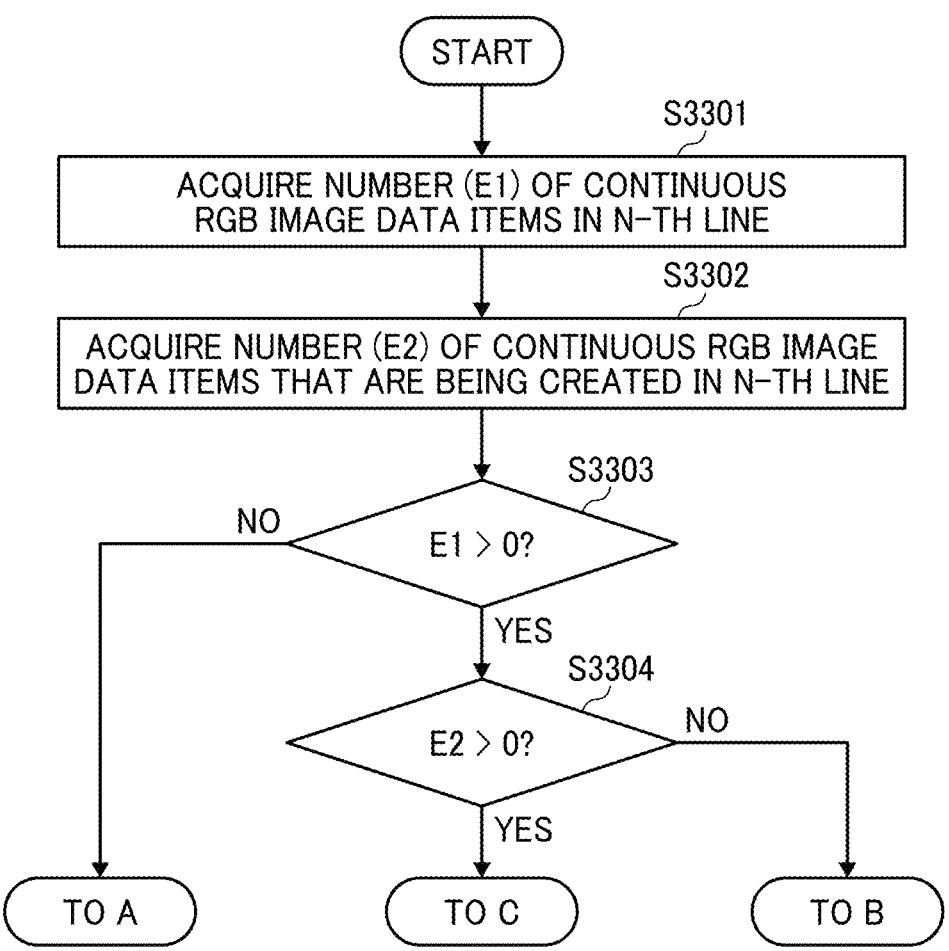
FIG. 33 is a flowchart illustrating the flow of an RGB image data block generation process in the second embodiment of the present disclosure.
Figure 34:
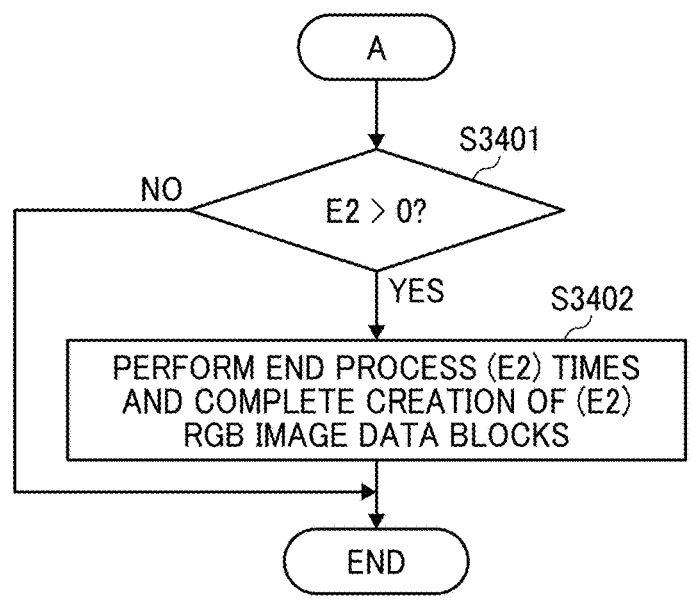
FIG. 34 is a flowchart illustrating the flow of the RGB image data block generation process in the second embodiment of the present disclosure.
Figure 35:
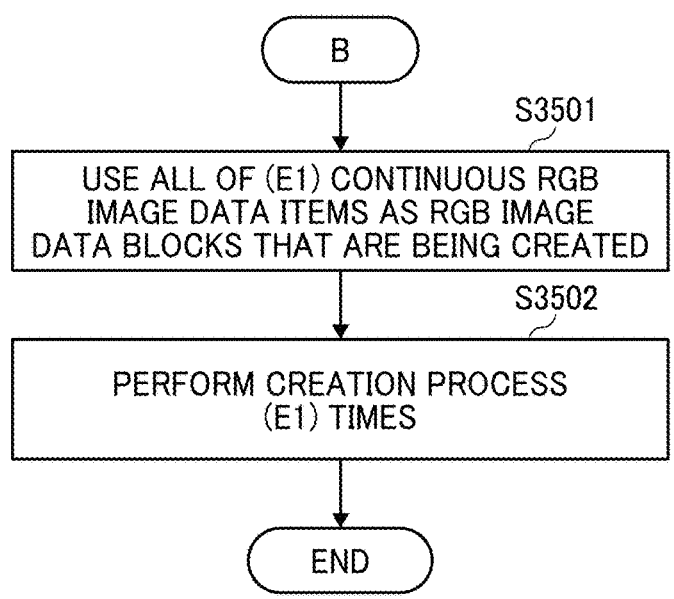
FIG. 35 is a flowchart illustrating the flow of the RGB image data block generation process in the second embodiment of the present disclosure.
Figure 36:
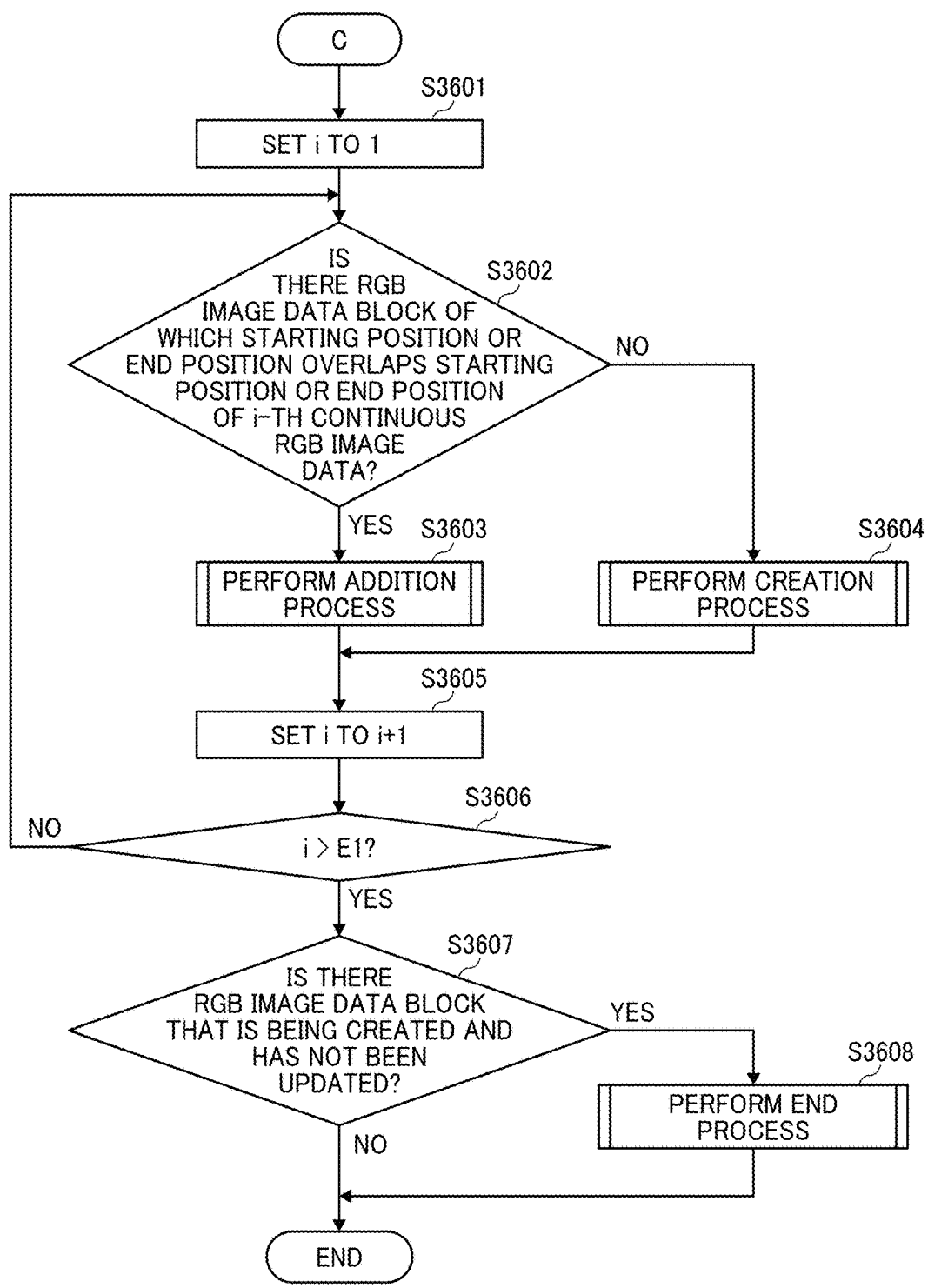
FIG. 36 is a flowchart illustrating the flow of the RGB image data block generation process in the second embodiment of the present disclosure.

FIG. 30 is a diagram illustrating RGB image data generated by the RGB boundary process according to the leading end position information and the rear end position information of the raster data according to this embodiment. FIG. 31 is a diagram illustrating information indicating RGB image data regions included in the RGB image data illustrated in FIG. 30. In FIG. 30, a pixel of an index color image is represented by a dotted line.

As illustrated in FIGS. 30 and 31, in the RGB image data according to this embodiment, index color image data is interposed between the continuous RGB image data 24a and the continuous RGB image data 24b.

Specifically, the RGB image data illustrated in FIG. 30 includes the continuous RGB image data 24a with RGB image data information indicating "a starting line: N−4, an end line: N+1, a starting pixel: 4, and an end pixel: 9" and the continuous RGB image data 24b with RGB image data information indicating "a starting line: N, an end line: N+5, a starting pixel: 19, and an end pixel: 24". The other pixels are index color images.

In this embodiment, the RGB boundary process is performed such that the index color image is removed when the lines are combined. FIG. 32 is a flowchart illustrating the flow of a process of combining the lines expressed by RGB image data according to this embodiment.

The line combiner 136 determines whether RGB image data is included in the current line (line N) (S3201). When RGB image data is included in the line N (S3201/YES), the line combiner 136 performs the RGB boundary process of aligning the leading end and with the rear end of the RGB image data included in the line N according to the leading end position information and the rear end position information (S3202).

When the RGB boundary process has not been performed for all of the lines included in the image data (S3203/NO), the line combiner 136 shifts the process target to an (N+1)-th line (S3204) and performs the process on an (N+1)-th line from S3201 again. When the RGB boundary process has been performed for all of the lines included in the image data (S3203/YES), the line combiner 136 ends this process.

Next, the flow of the RGB boundary process according to this embodiment will be described with reference to the flowcharts illustrated in FIGS. 33 to 36. FIGS. 33 to 36 are flowcharts illustrating the flow of the RGB boundary process according to this embodiment.

The line combiner 136 acquires the value (E1) of the number of RGB image data regions included in the line N which is the current line from the RGB position information storage 135 (S3301). Then, the line combiner 136 acquires the value (E2) of the number of RGB image data blocks that are being created (S3302).

When the value E1 acquired S3301 is not greater than 0 (S3303/NO), the line combiner 136 performs a process in S3401. When the value E2 acquired S3302 is not greater than 0 (S3401/NO), the line combiner 136 ends this process.

When the value E2 acquired S3302 is greater than 0 (S3401/YES), the line combiner 136 controls the creation parameters of all of the RGB image data blocks that are being created such that the creation parameters are "Done", completes the RGB image data block creation process (S3402), and ends this process.

When the value E1 acquired S3301 is greater than 0 (S3303/YES) and when the value E2 acquired S3302 is not greater than 0 (S3304/NO), the line combiner 136 performs the process in S3501.

The line combiner 136 uses all of E1 RGB image data regions as the RGB image data blocks that are being created (S3501). Then, the line combiner 136 performs the creation process E1 times (S3502) and ends this process. The creation process will be described in detail below.

When the value E1 acquired S3301 is greater than 0 (S3303/YES) and when the value E2 acquired S3302 is greater than 0 (S3304/YES), the line combiner 136 sets pixel position information i for determining a pixel to be processed among the pixels included in the line N to "i=1" (S3601).

Then, the line combiner 136 determines whether there is an RGB image data block of which the starting position or the end position overlaps an i-th pixel in the line N among E2 RGB image data blocks that are being created (S3602).

When there is an RGB image data block of which the starting position or the end position overlaps the i-th pixel in the line N among E2 RGB image data blocks that are being created (S3602/YES), the line combiner 136 performs an addition process (S3603). When the addition process is performed, the information of the starting position or the end position of the RGB image data block is updated.

When there is no RGB image data block of which the starting position or the end position overlaps the i-th pixel in the line N among E2 RGB image data blocks that are being created (S3602/NO), the line combiner 136 performs the creation process (S3604). When the creation process is performed, the information of the starting position or the end position of a new RGB image data block is updated.

The addition process and the creation process will be described in detail below.

When the process in S3603 or S3604 is performed, the line combiner 136 sets the pixel position information i indicating the position of the pixel that is being processed to "i=i+1" (S3605) and determines whether i is greater than E1 (S3606). When i is not greater than E1 (S3606/NO), the line combiner 136 performs a series of processes for an (i+1)-th pixel in the line N from S3602 again.

When i is greater than E1 (S3606/YES), the line combiner 136 determines whether there is an RGB image data block that has not been updated in the process in S3603 or S3604 (S3607). When there is an RGB image data block that has not been updated (S3607/YES), the line combiner 136 controls the creation parameter of a target RGB image data block such that the creation parameter is "Done (S3608) and ends this process.

When there is no RGB image data block which is being created and of which the information of the starting position or the information of the end position has not been updated (S3607/NO), the line combiner 136 ends this process.

Figure 37:
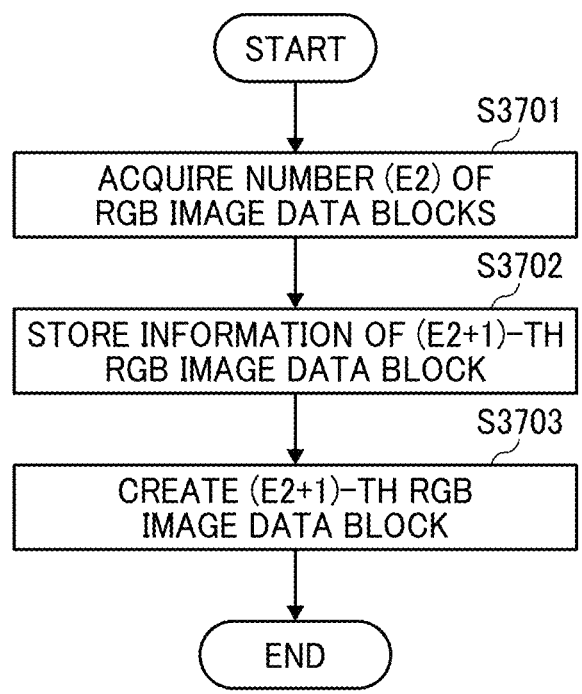
FIG. 37 is a flowchart illustrating the flow of an RGB image data block information creation process in the second embodiment of the present disclosure.

Next, the creation process will be described with reference to FIG. 37. FIG. 37 is a flowchart illustrating the flow of the creation process according to this embodiment. This process is performed in a case in which the RGB image data region included in the line that is being processed is at the end of the RGB image data block.

The line combiner 136 acquires the number (E2) of RGB image data blocks at the time the process in S3602 is performed (S3701). Then, for example, the line combiner 136 stores the following information as the information of an (E2+1)-th RGB image data block in the RGB position information storage 135 (S3702).

In the process in S3702, the line combiner 136 stores, as a start value of the information of a new RGB image data block, information indicating "a starting line: the number of a line that is being processed", "an end line: the number of the line that is being processed", "the position of a starting pixel: the position of a starting pixel in continuous RGB image data that is being processed", and "the position of an end pixel: the position of an end pixel in the continuous RGB image data that is being processed" in the RGB position information storage 135.

When the information of the RGB image data block is stored in the RGB position information storage 135, the line combiner 136 changes the creation parameter of the (E2+1)-th RGB image data block to "ON" (S3703) and ends this process.

Figure 38:
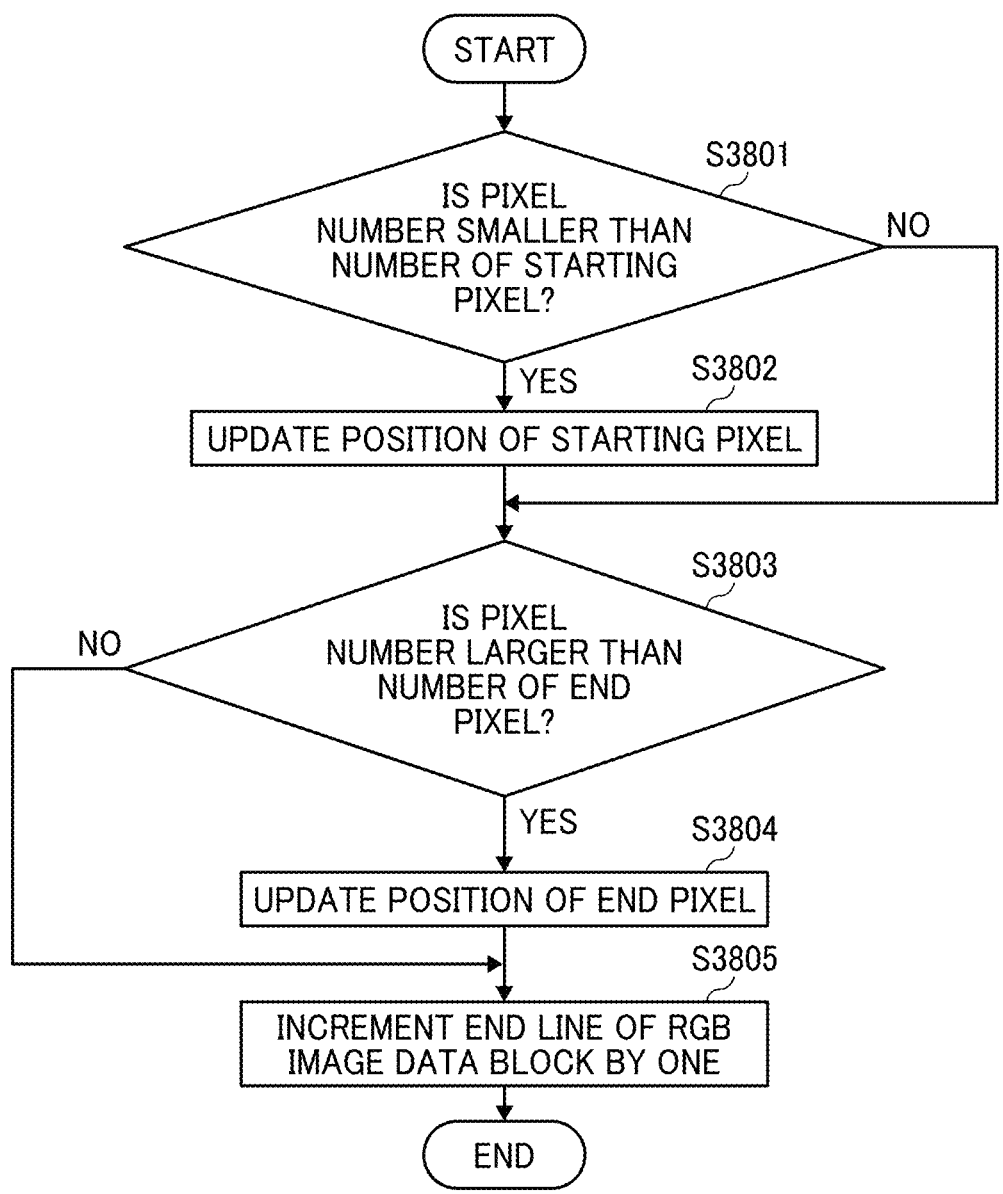
FIG. 38 is a flowchart illustrating the flow of an RGB image data block information addition process in the second embodiment of the present disclosure.

Next, the addition process will be described with reference to FIG. 38. FIG. 38 is a flowchart illustrating the flow of the addition process according to this embodiment. This process is performed when the pixels of an RGB image data region are added to the RGB image data block that is being created.

First, the line combiner 136 compares the number of a starting pixel in the RGB image data region to be added with the number of a starting pixel in the RGB image data block (S3801). When the number of the starting pixel in the RGB image data region to be added is less than the number of the starting pixel in the RGB image data block (S3801/YES), the line combiner 136 updates the number of the starting pixel in the RGB image data block with the number of the starting pixel in the RGB image data region to be added (S3802).

When the number of the starting pixel in the RGB image data region to be added is equal to or greater than the number of the starting pixel in the RGB image data block (S3801/NO), the line combiner 136 compares the number of an end pixel in the RGB image data region to be added with the number of an end pixel in the RGB image data block (S3803).

Then, when the number of the end pixel in the RGB image data region to be added is greater than the number of the end pixel in the RGB image data block (S3803/YES), the line combiner 136 updates the number of the end pixel in the RGB image data block with the number of the end pixel in the RGB image data region to be added (S3804).

When the number of the end pixel in the RGB image data region to be added is updated, the line combiner 136 increases the end line of the RGB image data block by 1 (S3805) and ends this process.

When the number of the starting pixel in the RGB image data region to be added is less than the number of the starting pixel in the RGB image data block (S3801/YES), the line combiner 136 increases the end line of the RGB image data block by 1 (S3805) and ends this process.

As such, in this embodiment, when a printing target page in which a plurality of regions with a large number of colors are present on lines in the sub-scanning direction is printed, a region that is not required to be expressed as an RGB image is trimmed. Therefore, it is possible to reduce a data size and to generate an RGB image data block.

Furthermore, the image processing apparatus 1 according to this embodiment can reduce a data size, reduce the processing time, and print a document file including a plurality of images with a small number of colors with high efficiency. In addition, it is possible to apply this process without distinguishing objects in the printing target page.

The above-described embodiments are illustrative and do not limit the scope of the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing apparatus comprising:
an indexing determiner to determine whether color information of pixels forming a line in printing target data are expressible by index colors, the color information being expressed by RGB;
an index processor to generate an index color image that includes pixels obtained by expressing, using the index colors, the color information of the pixels determined to be expressible by the index colors;

a line combiner to combine pixels of which the color information is expressed in a same aspect in a plurality of lines to generate an RGB image region that is a region of pixels of which the color information is expressed by the RGB and an index color image region that is a region of the index color image;

a drawing processor to perform a drawing process on each of the RGB image region and the index color image region to generate drawing information; and an image forming device to process the drawing information.

2. The image processing apparatus according to claim 1, wherein the index processor generates RGB image data that is a pixel obtained by expressing, using the RGB, the color information of a pixel determined unable to be expressed by the index colors.

3. The image processing apparatus according to claim 1, wherein the line combiner combines the pixels of which the color information is expressed in the same aspect in the plurality of lines to generate a plurality of RGB image regions and a plurality of index color image regions.

4. The image processing apparatus according to claim 1, further comprising:

a positional information storage to store information of a starting position of a pixel determined unable to be expressed by the index colors and information of an end position at which the pixel determined unable to be expressed by the index colors ends.

5. The image processing apparatus according to claim 1, wherein the line combiner generates the RGB image region according to information of a starting position and an end position of a pixel determined unable to be expressed by the index colors in each line.

6. The image processing apparatus according to claim 1, further comprising:

a positional information storage to store information of a starting position of a pixel determined unable to be expressed by the index colors and information of an end position at which the pixel determined unable to be expressed by the index colors ends in each of a plurality of regions of pixels determined unable to be expressed by the index colors.

7. The image processing apparatus according to claim 6, wherein the line combiner combines pixels in a plurality of lines in the plurality of regions of pixels determined unable to be expressed by the index colors according to the information of the starting position and the information of the end position to generate a plurality of RGB image regions.

8. The image processing apparatus according to claim 1, wherein the line combiner combines pixels having a same color look-up table for expressing the color information in a plurality of lines to generate the index color image region.

9. The image processing apparatus according to claim 1, wherein the line combiner combines lines including pixel regions of which the color information is expressed by the RGB to generate the RGB image region.

10. The image processing apparatus according to claim 9, wherein the line combiner determines a boundary between the RGB image region and the index color image region in the RGB image region generated by combining the lines, according to information of a starting position and an end position of a pixel determined unable to be expressed by the index colors in each line.

11. The image processing apparatus according to claim 9, wherein the line combiner determines a boundary between the RGB image region and the index color image region in the RGB image region generated by combining the lines, according to information of a starting position in a line determined to have a starting position with a shortest distance from a reference point that is a pixel at a predetermined position and information of an end position in a line determined to have an end position with a longest distance from the reference point among a plurality of lines.

12. The image processing apparatus according to claim 1, wherein the drawing processor overwrites a result of the drawing process on the RGB image region on a result of the drawing process on the index color image region to generate the drawing information.

13. The image processing apparatus according to claim 1, wherein the indexing determiner registers the color information of a pixel determined unable to be expressed by the index colors in a color look-up table for expressing the color information.

14. An image processing method comprising:

determining whether color information of pixels forming a line in printing target data are expressible by index colors, the color information being expressed by RGB;

generating an index color image that includes pixels obtained by expressing, using the index colors, the color information of pixels determined to be expressible by the index colors;

combining pixels of which the color information is expressed in a same aspect in a plurality of lines to generate an RGB image region that is a region of pixels of which the color information is expressed by the RGB and an index color image region that is a region of the index color image; and performing a drawing process on each of the RGB image region and the index color image region to generate drawing information to be processed by an image forming device.

15. A non-transitory recording medium storing program code that, when executed by one or more processors, causes the processors to perform an image processing method, the method comprising:

determining whether color information of pixels forming a line in printing target data are expressible by index colors, the color information being expressed by RGB;

generating, using the index colors, an index color image that includes pixels obtained by expressing the color information of pixels determined to be expressible by the index colors;

combining pixels of which the color information is expressed in a same aspect in a plurality of lines to generate an RGB image region that is a region of pixels of which the color information is expressed by the RGB and an index color image region that is a region of the index color image; and performing a drawing process on each of the RGB image region and the index color image region to generate drawing information to be processed by an image forming device.

* * * * *